United States Patent
Inoue et al.

(10) Patent No.: US 9,913,182 B2
(45) Date of Patent: Mar. 6, 2018

(54) RADIO COMMUNICATION SYSTEM, BASE STATION, NETWORK MANAGEMENT DEVICE, HANDOVER CONTROL METHOD AND PROGRAM

(71) Applicant: NEC Corporation, Minato-ku, Tokyo (JP)

(72) Inventors: Takamichi Inoue, Tokyo (JP); Yoshinori Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 110 days.

(21) Appl. No.: 15/036,861

(22) PCT Filed: Jun. 17, 2014

(86) PCT No.: PCT/JP2014/066049
§ 371 (c)(1),
(2) Date: May 16, 2016

(87) PCT Pub. No.: WO2015/079729
PCT Pub. Date: Jun. 4, 2015

(65) Prior Publication Data
US 2016/0302117 A1 Oct. 13, 2016

(30) Foreign Application Priority Data
Nov. 26, 2013 (JP) .................................. 2013-244001

(51) Int. Cl.
*H04W 36/00* (2009.01)
*H04W 24/10* (2009.01)
(Continued)

(52) U.S. Cl.
CPC ....... *H04W 36/0088* (2013.01); *H04W 24/10* (2013.01); *H04W 36/08* (2013.01);
(Continued)

(58) Field of Classification Search
CPC . H04W 36/0088; H04W 24/10; H04W 36/08; H04W 36/30; H04W 88/02; H04W 88/08
(Continued)

(56) References Cited

U.S. PATENT DOCUMENTS

| | | | | |
|---|---|---|---|---|
| 2010/0173633 A1* | 7/2010 | Catovic | ............... | H04W 76/027 455/436 |
| 2010/0273487 A1* | 10/2010 | Alonso-Rubio | .... | H04W 36/385 455/436 |

(Continued)

FOREIGN PATENT DOCUMENTS

| | | |
|---|---|---|
| JP | 2011-527156 A | 10/2011 |
| JP | 2012-249132 A | 12/2012 |

(Continued)

OTHER PUBLICATIONS

3rd Generation Partnership Project; "Evolved Universal Terrestrial Radio Access (E-UTRA); Radio Resource Control (RRC); Protocol specification(Release 11)", 3GPP TS36.331 v. 11.4.0, Jun. 2013, Cited in the Specification.

(Continued)

*Primary Examiner* — Obaidul Huq

(57) ABSTRACT

The base station notifies each mobile station of reporting conditions for causing the mobile station to transmit a measurement report containing measurement results of the radio quality. The reporting conditions include a first reporting condition and a second reporting condition in which the offset value added to the measurement result of the radio quality is greater than that of the first reporting condition and in which the guard time, that is a time from when the reporting condition is satisfied until the measurement report is transmitted, is shorter than that of the first reporting condition. The base station detects a mobile station that has transmitted a measurement report as a result of satisfaction of the second reporting condition as a handover required of (Continued)

mobile station whose radio quality becomes lower than a predetermined value within a predetermined period and performs a handover process of the mobile station.

4 Claims, 16 Drawing Sheets

(51) Int. Cl.
    *H04W 36/08* (2009.01)
    *H04W 36/30* (2009.01)
    *H04W 88/02* (2009.01)
    *H04W 88/08* (2009.01)

(52) U.S. Cl.
    CPC ............ *H04W 36/30* (2013.01); *H04W 88/02* (2013.01); *H04W 88/08* (2013.01)

(58) Field of Classification Search
    USPC ................................ 370/310, 328, 329, 331
    See application file for complete search history.

(56) References Cited

U.S. PATENT DOCUMENTS

| | | | | |
|---|---|---|---|---|
| 2012/0127876 | A1* | 5/2012 | Hunukumbure | H04W 24/00 370/252 |
| 2015/0319666 | A1* | 11/2015 | Kang | H04W 36/30 370/332 |

FOREIGN PATENT DOCUMENTS

| | | |
|---|---|---|
| JP | 2012-249245 A | 12/2012 |
| JP | 2013-110635 A | 6/2013 |
| WO | 2010/002926 A1 | 1/2010 |
| WO | 2013/039434 A1 | 3/2013 |
| WO | 2013/169904 A1 | 11/2013 |

OTHER PUBLICATIONS

3rd Generation Partnership Project; "Evolved Universal Terrestrial Radio Access (E-UTRAN); X2 Application Protocol (X2AP)(Release 11)"; 3GPP TS36.423 v. 11.5.0, Jun. 2013, Cited in the Specification.

3rd Generation Partnership Project; "Evolved Universal Terrestrial Radio Access (E-UTRA); Mobility enhancements in heterogeneous networks(Release 11)"; 3GPP TR36.839 v. 11.1.0, Dec. 2013, Cited in the Specification.

ZTE Corporation, "Performance Analysis on Early HO Preparation and Early HO CMD", 3GPP TSG-RAN WG2 Meeting #83, R2-132375, Barcelona, Spain, Aug. 19-23, 2013, Cited in ISR.

Samsung, "Gradient based scaling , further information", 3GPP TSG-RAN2#83 bis meeting, Ljubljana, Slovenia, Oct. 7-11, 2013, R2-133589 Cited in ISR.

QUALCOMM Europe, "UE Intra-Frequency Measurement Schemes",TSG-RAN working Group 2(Radio layer 2 and Radio layer 3), Malmoe, Sweden, Sep. 20-24, 1999, R2-99a66 Cited in ISR.

Samsung, "Improving HO performance in HetNet", 3GPP TSG RAN WG2 Meeting #81 bis, Chicago, Apr. 15-19, 2014, R2-131315 Cited in ISR.

International Search Report for PCT Application No. PCT/JP2014/066049, dated Sep. 9, 2014.

3rd Generation Partnership Project; Technical Specification Group Radio Access Network; "HO Performance Improvement in Hetnet", ZTE Corporation, 3GPP TSG-RAN WG2 Meeting #81 bis, R2-130957, Chicago, USA, Apr. 15-19, 2013.

Takamichi Inoue et al., "Dual Handover Triggers to Improve QoE for Indoor and Outdoor Mobility", 2014 IEEE 25th Annual International Symposium on Personal, Indoor and Mobile Radio Communications (PIMRC), Sep. 2, 2014, pp. 1727-1731.

Extended European Search Report for EP Application No. EP14866615.9 dated Apr. 4, 2017.

* cited by examiner

FIG. 12

*SOURCE CELL:#0

| NEIGHBOR CELL (TARGET CELL) | #1 | #2 | ... | #N |
|---|---|---|---|---|
| THE NUMBER OF MEASUREMENT REPORTS | 100 | 120 | | 50 |
| THE NUMBER OF REPORTS OF CONFIG1 | 40 | 100 | | 45 |
| THE NUMBER OF REPORTS OF CONFIG2 | 60 | 20 | | 5 |

FIG. 14

*SOURCE CELL:#0

| NEIGHBOR CELL (TARGET CELL) | #1 | #2 | ... | #N |
|---|---|---|---|---|
| THE NUMBER OF MEASUREMENT REPORTS | 100 | 120 | | 50 |
| THE NUMBER OF TIMES RSRQ BECAME LOWER THAN A PREDETERMINED VALUE | 40 | 10 | | 2 |

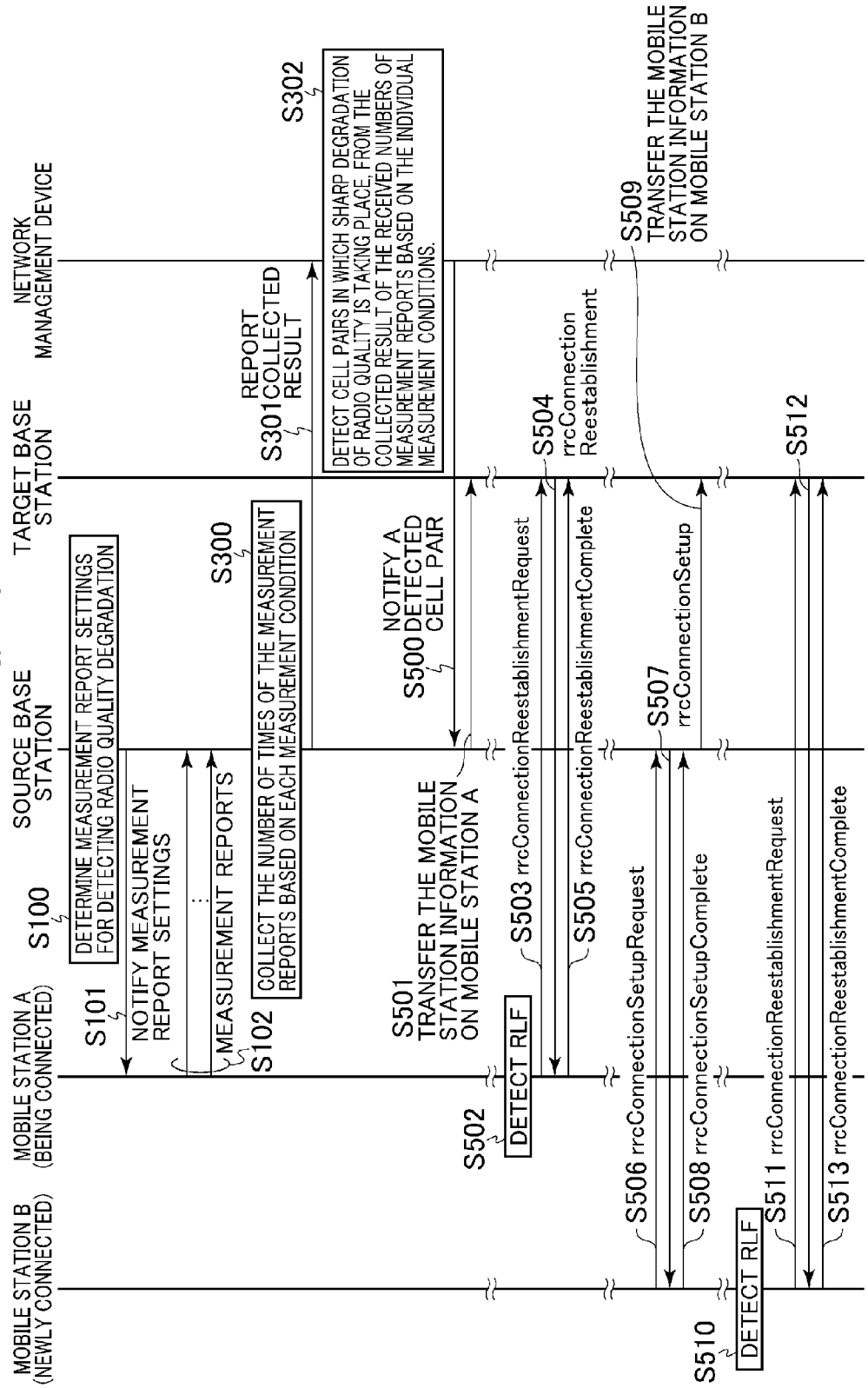

RADIO COMMUNICATION SYSTEM, BASE STATION, NETWORK MANAGEMENT DEVICE, HANDOVER CONTROL METHOD AND PROGRAM

This application is a National Stage Entry of PCT/JP2014/066049 filed on Jun. 17, 2014, which claims priority from Japanese Patent Application 2013-244001 filed on Nov. 26, 2013, the contents of all of which are incorporated herein by reference, in their entirety.

TECHNICAL FIELD

The present invention relates to a radio communication system, a base station and network management device included in a radio communication system, a handover control method for a radio communication system and a program for causing a computer to function as a base station and a network management device.

BACKGROUND ART

In wireless cellular systems represented by W-CDMA (Wideband-Code Division Multiple Access) and LTE (Long Term Evolution) standardized by 3GPP (3rd Generation Partnership Project) or WiMAX (Worldwide Interoperability for Microwave Access) standardized by IEEE (Institute of Electrical and Electronic Engineers), mobile data traffic is accommodated by a large coverage outdoor cell (e.g. macro cell) that is managed by a base station installed outdoors. However, in recent years the amount of mobile data traffic generated indoors has been increasing. To deal with this, installation of indoor base stations for managing indoor cells (e.g., femtocells) having a relatively small coverage have been underway. It is therefore thought that in wireless cellular systems, the traffic environment in which conventionally deployed outdoor cells and newly added indoor cells coexist will grow in the future.

In the wireless cellular system, each base station manages one or more cells while a mobile station establishes radio connection with a cell under which the mobile station resides (exactly speaking, makes a connect with a base station that manages the cell), whereby the mobile station can perform communication with a superior network via the cell. When the mobile station moves from a cell that is connected to a neighboring cell, a process of switching one cell to another, called handover (Handover: HO) is performed. Herein, the cell to which the mobile station is connected is called the source cell, whereas the cell to which the mobile station will be switched is called the target cell.

In the above LTE, in order to perform handover the source base station managing the source cell instructs each mobile station that is connected to transmit a measurement report when a specific event has occurred. An example of the specific event is a case where the radio quality of a cell (which will be referred to hereinbelow as the neighboring cell) adjacent to the source cell becomes better than the radio quality of the source cell. To determine the radio quality of a cell, the received power of the downlink reference signal (RSRP: Reference Signal Received Power), or the received quality of the downlink reference signal (RSRQ: Reference Signal Received Quality), measured by the mobile station, may be used.

The measurement report generated at the mobile station includes the measurement results on radio quality measured by each of the source and neighboring cells. Upon receiving a measurement report from a mobile station, the source base station determines a target cell based on the measurement report. Then, a handover process including signaling for exchanging necessary control information between the target base station managing the target cell and the mobile station is carried out. In most cases, the target cell is selected from the neighboring cells.

Next, description will be made on one example of reporting conditions specified in the 3GPP technical specifications (Non-patent Document 1) in LTE to trigger transmission of a measurement report.

In this technical specification, as one of transmission triggers of a measurement report, Event A3 (Neighbor becomes offset better than serving) is specified. In Event A3 the reporting condition of a measurement report is defined by the following expression (1).

$$Mn + Ofn + Ocn - Hys > Mp + Ofp + Ocp + \text{Off} \quad (1)$$

Ex. (1) indicates that the radio quality of the neighbor cell (left side) is better than the radio quality of the source cell (right side). Mn in Ex. (1) is the radio quality of the neighboring cell measured by the mobile station. Mp is the radio quality of the source cell. Ofn is the frequency band offset (offsetFreq) of the neighbor cell. Ofp is the frequency band offset of the source cell. Ocn is the cell specific offset of the neighboring cell. Ocp is the cell specific offset of the source cell. Hys is the hysteresis parameter for the reporting condition of Event A3, to be added to the radio quality. Off is the offset parameter to be used for the reporting condition of Event A3, to be added to the radio quality.

Here, the above Ocn and Ocp are configured for each cell pair of the source cell and its neighboring cell. Accordingly, when there exist a plurality of neighboring cells is present, the source base station sets Ocn and Ocp for each neighboring cell. Further, the source base station manages the cell individual offset (CIO: Cell Individual Offset) calculated from Ocn and Ocp by use of the following expression (2), for each cell pair. Since the greater CIO, Ocn becomes a value relatively greater than Ocp, handover from the source cell to the neighbor cell is promoted.

$$CIO = Ocn - Ocp \quad (2)$$

Upon determining the reporting condition shown by the above Ex. (1), the source base station notifies the determined reporting condition for each of mobile stations that are connected thereto, to the corresponding mobile station. The reporting condition notified to each mobile station includes the type of the reporting condition (the event type) and parameter values to be used.

The mobile station transmits a measurement report to the source base station when the measurement results of the radio quality of the source cell and the neighbor cell meet the reporting condition of the above Ex. (1) and when the state of the reporting condition that has been satisfied has continued for a predetermined period of time TTT (Time to Trigger) or longer. TTT is also called guard time.

When receiving a measurement report from the mobile station, the source base station determines the target cell for handover based on the measurement report and makes a request for handover (Handover Request) to the target base station managing that cell. When requesting handover, the source base station transmits mobile station information for identifying the mobile station to be handed off, to the target base station. The mobile station information is called UE context in LTE and is information that is used between the base stations that manage the source cell and target cell to identify the mobile station at the time of handover.

Examples of the mobile station information include AS-Config described in Non-patent Document 1 and UE history information described in Non-patent Document 2. AS-Config contains the ID (identification data) of the mobile station, system setting information on the source cell or the like. UE history information is information relating to communication history of the mobile station and contains the ID of, staying time in, the cell to which the mobile station was last connected or the like.

Incidentally, since the above-described handover is a follow-up process that starts the necessary procedures after detecting deterioration of radio quality, there is a risk that the process cannot catch up if an abrupt change of radio quality takes place. If handover fails, the mobile station continues communication with the source cell with the degraded radio quality. As a result, if the radio quality of the source cell degrades to a level lower than the communication permissible quality before the mobile station connects to another cell, a period in which communication is lost (temporary disruption) occurs in the mobile station.

In order to reduce such handover failures, there have been known methods of dynamically adjusting handover parameters such as the aforementioned CIO, TTT and the like.

In LTE, as handover failures, Too Late Handover, Too Early Handover, Handover to Wrong Cell, and Ping-Pong Handover are defined. Too Late Handover is a handover failure that occurs when the time of a handover to the target cell is too late. Too Early Handover is a handover failure that occurs when the time of a handover to the target cell is too early. Handover to Wrong Cell is a handover failure that takes place when, after connection to the target cell that has been determined to be fine in radio quality, the radio quality of the target cell degrades shortly. Ping-Pong Handover is a handover failure in which many handovers are repeated between the source cell and an identical neighbor cell in a short period of time.

As described above, the mobile station transmits a measurement report when the state of the reporting condition of, for example Ex. (1) that has been satisfied has continued for the predetermined guard time TTT or longer. That is, if TTT is set at a large value, the start time of a handover is delayed so that handover becomes unlikely to occur.

A method of reducing handover failures (Too Late Handover, Too Early Handover) by adjusting handover parameters (TTT, CIO, etc.) based on the aforementioned measurement report from the mobile station has been disclosed in Patent Document 1, for example. In Patent Document 1, in reducing Too Late Handover, the CIO value is made large to thereby make the handover time earlier. Further, when the handover failure cannot be resolved if CIO is made greater up to the predetermined upper limit, TTT is changed to a smaller value to make the handover start time earlier, to thereby reduce the occurrence of handover failures.

FIG. 1 is a graph schematically showing the reasons why the occurrence of handover failures is reduced by adjusting the handover parameter (CIO). RSRP and RSRQ characteristics shown in FIGS. 1(a) and 1(b) are the same.

FIG. 1(a) shows how a handover failure occurs due to the handover process starting too late. In FIG. 1(a), the radio quality (RSRP) of the source cell lowers so that the reporting condition defined by the above Ex. (1) holds, then the radio quality (RSRQ) of the source cell becomes lower than a predetermined threshold (required quality) before the lapse of TTT, causing a radio link failure (RLF: Radio Link Failure).

In this case, when the CIO value set for the radio quality (RSRP) of the neighbor cell is made larger, it is possible to make earlier the time when the reporting condition defined by Ex. (1) is satisfied as shown in FIG. 1(b), hence preventing occurrence of RLF.

As mentioned above, it is thought that in the wireless cellular system the traffic environment in which conventionally deployed outdoor cells and newly added indoor cells coexist will grow. In such communication environment including both outdoor cells and indoor cells, the radio quality at a mobile station changes sharply if the mobile station moves between outdoors and indoors. As a result, there occur cases where handover failures cannot be reduced by adjusting handover parameters alone as described above.

This problem in the background art will be described with reference to FIG. 2. The following description will be made by giving an example where the source cell is an outdoor cell and the target cell is an indoor cell.

FIG. 2 is a graph schematically showing the mechanism of change of the radio quality (RSRP, RSRQ) of a mobile station moving from an outdoor cell to an indoor cell.

When the mobile station moves from outdoors to indoors, the RSRP of the source cell (outdoor cell) sharply degrades due to penetration loss upon passage of radio waves through walls etc. because the outdoors and the indoors are partitioned by building walls and the like. On the other hand, the RSRQ of the source cell (outdoor cell) also sharply degrades because of increase of interference waves from the target cell (indoor cell) in addition to the aforementioned penetration loss. Here, "sharp degradation" means that radio quality lowers greater than a specified value within a predetermined period, indicating a case where, for example, RSRP or RSRQ is lower than 10 dB or greater than 10 dB within some hundred milliseconds.

Usually, the time required for a handover in LTE (the time from when the reporting condition defined by Ex. (1) becomes satisfied so that the mobile station transmits the measurement report when the mobile station switches its connection from the source cell to the target cell) is as much as some hundreds milliseconds. In 3GPP, the index of the penetration loss is assumed to be 10 dB or 20 dB.

On the other hand, in the background art for adjusting the aforementioned handover parameters, the upper limit of CIO adjustment is set as high as 6 dB. The reason is that if the upper limit of CIO adjustment is set equal to or higher than 6 dB, there occurs a risk that the mobile station will connect with a cell that cannot meet the quality of radio communication (the necessary quality). If the mobile station connects with a cell that does not meet the necessary quality, the mobile station faces difficulty in signaling with the cell so that the uplink loses synchronization, causing a RLF.

That is, when the mobile station moves from an outdoor cell to an indoor cell, even if CIO is changed to the upper limit of adjustment a RLF takes place hence causing a handover failure (Too Late Handover) because the penetration loss is greater than the upper limit adjustment.

RLF judgment in LTE is effected by the mobile station based on the decision number N310 as a parameter for RLF judgment notified from the base station and decision timer T310. When the radio quality of the source becomes equal to or lower than a predetermined threshold (RLF judgment threshold), the mobile station confirms whether or not the state exceeds the set time of decision timer T310. Then, the mobile station counts the number of times the radio quality has become lower than the RLF judgment threshold after the lapse of the set time of judgment time T310, and when the number of times reaches the above decision number N310, occurrence of a RLF is determined.

RELATED ART DOCUMENTS

Patent Documents

Patent Document 1: International Publication No. 2010/002926

Non-Patent Documents

Non-patent Document 1: 3GPP TS36.331 v. 11.4.0, "Evolved Universal Terrestrial Radio Access (E-UTRA); Radio Resource Control (RRC); Protocol specification," 2013
Non-patent Document 2: 3GPP TS36.423 v. 11.5.0, "Evolved Universal Terrestrial Radio Access (E-UTRAN); X2 Application Protocol (X2AP)," 2013
Non-patent Document 3: 3GPP TR36.839 v. 11.1.0, "Evolved Universal Terrestrial Radio Access (E-UTRA); Mobility enhancements in heterogeneous networks," 2013

SUMMARY

It is therefore an object of the present invention to provide a radio communication system that can contribute to reducing time of temporary disruption of communication accompanying handover, a base station and a network management device including the radio communication system, a handover control method in the radio communication system and a program for causing a computer to function as the base station and the network management device.

An exemplary aspect of the radio communication system of the present invention for achieving the above object, comprises a plurality of base stations, each performing radio communication with mobile stations via a cell managed thereby, wherein
the base station comprises:
a measurement report setter that notifies each mobile station that is connected thereto of reporting conditions for causing the mobile station to transmit a measurement report containing measurement results of the radio quality of the cell thereof and each of neighboring cells adjacent to the subject cell; and
a handover processor that, based on the measurement reports transmitted from the mobile stations, detects a mobile station of whose radio quality becomes lower than a predetermined value within a predetermined period and performs a handover process of the mobile station,
wherein the measurement report setter notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and
wherein the handover processor detects a mobile station that has transmitted a measurement report as a result of satisfaction of the second reporting condition as a mobile station that requires the handover.

An exemplary aspect of the radio communication system comprises a plurality of base stations, each performing radio communication with mobile stations via a cell managed thereby, wherein
the base station comprises:
a measurement report setter that notifies each mobile station that is connected thereto of reporting conditions for causing the mobile station to transmit a measurement report containing measurement results of the radio quality of the cell thereof and each of neighboring cells adjacent to the subject cell; and
a handover processor that, based on the measurement reports transmitted from the mobile stations, detects a mobile station of whose radio quality becomes lower than a predetermined value within a predetermined period and performs a handover process of the mobile station,
wherein the measurement report setter, upon receiving the measurement report from the mobile station, changes the reporting condition at the mobile station to a periodic reporting condition that causes the mobile station to transmit a measurement result of the radio quality periodically, and,
wherein the handover processor determines the amount of degradation of the radio quality from multiple measurement reports transmitted from the mobile station, and detects the mobile station as a mobile station that requires a handover when the amount of degradation is greater than the predetermined value.

An exemplary aspect of the radio communication system comprises: a plurality of base stations, each performing radio communication with mobile stations via a cell managed thereby; and a network management device managing the plural base stations, wherein
the base station comprises:
a measurement report setter that notifies each mobile station that is connected thereto of reporting conditions for causing the mobile station to transmit a measurement report containing measurement results of the radio quality of the cell thereof and of each of neighboring cells adjacent to the subject cell; and
a communication quality storage that collects measurement reports transmitted from the mobile stations and notifies the collected statistical information to the network management device,
wherein the measurement report setter notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and
wherein the network management device comprises a cell pair detector that determines the probability of the measurement reports transmitted based on satisfaction of the second reporting condition, from the number of measurement reports transmitted based on satisfaction of the second reporting condition relative to the total number of measurement reports transmitted based on satisfaction of the first reporting condition and second reporting condition, and that detects a cell pair formed of the cell in combination with the neighboring cell whose radio quality falls lower than a predetermined value within a predetermined period when the probability exceeds a predetermined detection threshold.

An exemplary aspect of the radio communication system comprises: a plurality of base stations, each performing radio communication with mobile stations via a cell managed thereby; and a network management device managing the plural base stations, wherein
the base station comprises:
a measurement report setter that notifies each mobile station that is connected thereto of reporting conditions for causing the mobile station to transmit a measurement report containing measurement results of the radio quality of the cell thereof and of each of neighboring cells adjacent to the subject cell; and a communication quality storage that collects measurement reports transmitted from the mobile stations and notifies the collected statistical information to the network management device, wherein the network management device comprises a cell pair detector that, based on the reported number of measurement reports transmitted based on satisfaction of the reporting conditions, notified from the base station and the number of times the radio quality reported by the measurement reports has become lower than the predetermined required quality, determines the probability that the radio quality becomes lower than the required quality, and that detects a cell pair formed of the cell in combination with the neighboring cell whose radio quality falls lower than a predetermined value within a predetermined period when the probability exceeds a predetermined detection threshold.

An exemplary aspect of the base station of the present invention is a base station that is provided for a radio communication system to perform radio communication with mobile stations via a cell managed thereby, comprising:

a measurement report setter that notifies each mobile station that is connected thereto of reporting conditions for causing the mobile station to transmit a measurement report containing measurement results of the radio quality of the cell thereof and of each of neighboring cells adjacent to the subject cell; and a handover processor that, based on the measurement reports transmitted from the mobile stations, detects a mobile station whose radio quality becomes lower than a predetermined value within a predetermined period and performs a handover process of the mobile station, wherein the measurement report setter notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and the handover processor detects a mobile station that has transmitted a measurement report as a result of satisfaction of the second reporting condition as a mobile station that needs the handover.

An exemplary aspect of the base station that is provided for a radio communication system to perform radio communication with mobile stations via a cell managed thereby, comprises:

a measurement report setter that notifies each mobile station that is connected thereto of reporting conditions for causing the mobile station to transmit a measurement report containing measurement results of the radio quality of the cell thereof and of each of neighboring cells adjacent to the subject cell; and a handover processor that, based on the measurement reports transmitted from the mobile stations, detects a mobile station whose radio quality becomes lower than a predetermined value within a predetermined period and performs a handover process of the mobile station, wherein the measurement report setter, upon receiving the measurement report from the mobile station, changes the reporting condition at the mobile station to a periodic reporting condition that causes the mobile station to transmit a measurement result of the radio quality periodically, and wherein the handover processor determines the amount of degradation of the radio quality from multiple measurement reports transmitted from the mobile station, and detects the mobile station as a mobile station that requires the handover when the amount of degradation is greater than the predetermined value.

An exemplary aspect of the base station that is provided for a radio communication system to perform radio communication with mobile stations via a cell managed thereby, comprises:

a measurement report setter that notifies each mobile station that is connected thereto of reporting conditions for causing the mobile station to transmit a measurement report containing measurement results of the radio quality of the cell thereof and of each of neighboring cells adjacent to the subject cell;

a communication quality storage that collects measurement reports transmitted from the mobile stations and notifies the collected statistical information to a superior device that manages the own base station; and a radio parameter controller that modifies, at least, one of the transmission power, the antenna tilt angle, and the decision timer used for determining whether any problem has occurred on the link with the mobile station, in accordance with the superior device, wherein the measurement report setter notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and wherein the communication quality storage transmits the number of measurement reports transmitted based on satisfaction of the first reporting condition and the number of measurement reports transmitted based on satisfaction of the second reporting condition, to the superior device.

An exemplary aspect of the base station that is provided for a radio communication system to perform radio communication with mobile stations via a cell managed thereby, comprises:

a measurement report setter that notifies each mobile station that is connected thereto of reporting conditions for causing the mobile station to transmit a measurement report containing measurement results of the radio quality of the cell thereof and of each of neighboring cells adjacent to the subject cell;

a communication quality storage that collects measurement reports transmitted from the mobile stations and notifies the collected statistical information to a superior device that manages the own base station; and a radio parameter controller that modifies, at least, one of the transmission power, the antenna tilt angle, and the decision timer used for determining whether any problem has occurred on the link with the mobile station, in accordance with the superior device, wherein the communication quality storage transmits the reported number of measurement reports transmitted based on satisfaction of the reporting conditions and the number of times the radio quality reported by the measurement reports has become lower than the predetermined required quality, to the superior device.

An exemplary aspect of the base station that is provided for a radio communication system to perform radio communication with mobile stations via a cell managed thereby, comprises:

a measurement report setter that notifies each mobile station that is connected thereto of reporting conditions for causing the mobile station to transmit a measurement report containing measurement results of the radio quality of the cell thereof and of each of neighboring cells adjacent to the subject cell;

a communication quality storage that collects measurement reports transmitted from the mobile stations and notifies the collected statistical information to a superior device that manages the own base station; and a mobile station information forwarder that transmits mobile station information for identifying mobile stations that are connected to the cell managed thereby, to a target base station that manages a cell to which the mobile stations are switched by handovers, at a predetermined timing, wherein the measurement report setter notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and wherein the communication quality storage transmits the number of measurement reports transmitted based on satisfaction of the first reporting condition and the number of measurement reports transmitted based on satisfaction of the second reporting condition, to the superior device.

An exemplary aspect of the base station that is provided for a radio communication system to perform radio communication with mobile stations via a cell managed thereby, comprises:

a measurement report setter that notifies each mobile station that is connected thereto of reporting conditions for causing the mobile station to transmit a measurement report containing measurement results of the radio quality of the cell thereof and of each of neighboring cells adjacent to the subject cell;

a communication quality storage that collects measurement reports transmitted from the mobile stations and notifies the collected statistical information to a superior device that manages the own base station; and a mobile station information forwarder that transmits mobile station information for identifying mobile stations that are connected to the cell managed thereby, to a target base station that manages a cell to which the mobile stations are switched by handovers, at a predetermined timing, wherein the communication quality storage transmits the reported number of measurement reports transmitted based on satisfaction of the reporting conditions and the number of times the radio quality reported by the measurement reports has become lower than the predetermined required quality, to the superior device.

An exemplary aspect of the network management device of the present invention is a network management device managing a plurality of base stations, each performing radio communication with mobile stations via a cell, comprising a cell pair detector that, when receiving the number of measurement reports that are transmitted from the base station based on satisfaction of the first reporting condition that causes the mobile stations to transmit a measurement report containing a measurement result of the radio quality for the cell managed by the base station that is connected to the mobile stations and of each of neighboring cells adjacent to the cell, to the base station, and the number of measurement reports transmitted from the base station based on satisfaction of the second reporting condition different from the first reporting condition, determines the probability of the measurement reports transmitted based on satisfaction of the second reporting condition, from the number of measurement reports transmitted based on satisfaction of the second reporting condition relative to the total number of measurement reports transmitted based on satisfaction of the first reporting condition and second reporting condition, and that detects a cell pair formed of the cell in combination with the neighboring cell whose radio quality falls lower than a predetermined value within a predetermined period when the probability exceeds a predetermined detection threshold, wherein the second reporting condition is that the offset value added to the measurement result of the radio quality is set to be greater than that of the first reporting condition and a guard time, that is a time from when the reporting condition is satisfied until the measurement report is transmitted, is set at a value shorter than that of the first reporting condition.

An exemplary aspect of the network management device managing a plurality of base stations, each performing radio communication with mobile stations via a cell, comprises a cell pair detector that, when receiving the number of measurement reports that are transmitted from the base station based on satisfaction of the reporting conditions that cause the mobile stations to transmit a measurement report containing a measurement result of the radio quality for the cell managed by the base station that is connected to the mobile stations and of each of neighboring cells adjacent to the cell, to the base station, and the number of times the radio quality reported by the measurement report has become lower than the predetermined required quality, determines the probability that the radio quality becomes lower than the required quality, from the reported number of measurement reports and the number of times the radio quality has become lower than the predetermined required quality, and that, when the probability exceeds a predetermined detection threshold, detects the cell pair as a cell pair formed of the cell in combination with the neighboring cell whose radio quality falls lower than a predetermined value within a predetermined period.

An exemplary aspect of the handover control method of the present invention is a handover control method for use in a radio communication system comprising a plurality of base stations, each performing radio communication with mobile stations via a cell managed thereby, wherein the base station notifies each mobile station that is connected thereto of reporting conditions for causing the mobile station to transmit a measurement report containing measurement results of the radio quality of the cell thereof and of each of neighboring cells adjacent to the subject cell, the reporting conditions including a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and detects, based on the measurement report transmitted from the mobile station, the mobile station that has transmitted a measurement report by satisfaction of the second reporting condition, as a mobile station that requires a handover, and whose radio quality becomes lower than a predetermined value within a predetermined period.

An exemplary aspect of the handover control method for use in a radio communication system comprising a plurality of base stations, each performing radio communication with mobile stations via a cell managed thereby, wherein the base station notifies each mobile station that is connected thereto of reporting conditions for causing the mobile station to transmit a measurement report containing measurement results of the radio quality of the cell thereof and of each of neighboring cells adjacent to the subject cell, upon receiving the measurement report from the mobile station, changes the reporting condition at the mobile station to a periodic reporting condition that causes the mobile station to transmit a measurement result of the radio quality periodically, and determines, based on the measurement reports transmitted from the mobile station, the amount of degradation of the radio quality from multiple measurement reports transmitted from the mobile station, and detects the mobile station as a mobile station that requires handover, and whose radio quality becomes lower than a predetermined value within a predetermined period when the amount of degradation is greater than the predetermined value.

An exemplary aspect of the handover control method for use in a radio communication system comprising a plurality of base stations, each performing radio communication with mobile stations via a cell managed thereby; and, a network management device managing the plural base stations, wherein the base station notifies each mobile station that is connected thereto of reporting conditions for causing the mobile station to transmit a measurement report containing measurement results of the radio quality of the cell thereof and of each of neighboring cells adjacent to the subject cell, the reporting conditions including a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and collects the measurement reports transmitted from the mobile stations and notifies the collected statistical information to the network management device, wherein the network management device determines the probability of the measurement reports transmitted based on satisfaction of the second reporting condition, from the number of measurement reports transmitted based on satisfaction of the second reporting condition relative to the total number of measurement reports transmitted based on satisfaction of the first reporting condition and second reporting condition and detects a cell pair formed of the cell in combination with the neighboring cell whose radio quality falls lower than a predetermined value within a predetermined period when the probability exceeds a predetermined detection threshold.

An exemplary aspect of the handover control method for use in a radio communication system comprising a plurality of base stations, each performing radio communication with mobile stations via a cell managed thereby; and, a network management device managing the plural base stations, wherein the base station notifies each mobile station that is connected thereto of reporting conditions for causing the mobile station to transmit a measurement report containing measurement results of the radio quality of the cell thereof and of each of neighboring cells adjacent to the subject cell, and collects the measurement reports transmitted from the mobile stations and notifies the collected statistical information to the network management device, wherein the network management device, based on the reported number of measurement reports transmitted based on satisfaction of the reporting conditions, notified from the base station and the number of times the radio quality reported by the measurement reports has become lower than the predetermined required quality, determines the probability that the radio quality becomes lower than the required quality, and detects a cell pair formed of the cell in combination with the neighboring cell whose radio quality falls lower than a predetermined value within a predetermined period when the probability exceeds a predetermined detection threshold.

An exemplary aspect of the program of the present invention is a program that makes a computer function as a base station provided for a radio communication system to perform radio communication with mobile stations via a cell managed thereby, causes the computer to function as a measurement report setter that notifies each mobile station that is connected thereto of reporting conditions for causing the mobile station to transmit a measurement report containing measurement results of the radio quality of the cell thereof and of each of neighboring cells adjacent to the subject cell, and a handover processor that, based on the measurement reports transmitted from the mobile stations, detects a mobile station whose radio quality becomes lower than a predetermined value within a predetermined period and performs a handover process of the mobile station, wherein the computer is made to function as the measurement report setter which notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and wherein the computer is made to function as the handover processor which detects a mobile station that has transmitted a measurement report as a result of satisfaction of the second reporting condition as a mobile station that requires handover.

An exemplary aspect of the program that makes a computer function as a base station provided for a radio communication system to perform radio communication with mobile stations via a cell managed thereby, causes the computer to function as a measurement report setter that notifies each mobile station that is connected thereto of reporting conditions for causing the mobile station to transmit a measurement report containing measurement results of the radio quality of the cell thereof and of each of neighboring cells adjacent to the subject cell, and a handover processor that, based on the measurement reports transmitted from the mobile stations, detects a mobile station whose radio quality becomes lower than a predetermined value within a predetermined period and performs a handover process of the mobile station, wherein the computer is made to function as the measurement report setter which, upon receiving the measurement report from the mobile station changes the reporting condition at the mobile station to a periodic reporting condition that causes the mobile station to transmit a measurement result of the radio quality periodically, and wherein the computer is made to function as the handover processor which determines the amount of degradation of the radio quality from multiple measurement reports transmitted from the mobile station, and detects a mobile station as a mobile station that requires handover when the amount of degradation is greater than the predetermined value.

An exemplary aspect of the program that makes a computer function as a base station provided for a radio communication system to perform radio communication with mobile stations via a cell managed thereby, causes the computer to function as a measurement report setter that notifies each mobile station that is connected thereto of reporting conditions for causing the mobile station to transmit a measurement report containing measurement results of the radio quality of the cell thereof and of each of neighboring cells adjacent to the subject cell, a communication quality storage that collects measurement reports transmitted from the mobile stations and notifies the collected statistical information to a superior device that manages the own base station, and a radio parameter controller that modifies, at least, one of the transmission power, the antenna tilt angle, and the decision timer used for determining whether any problem has occurred on the link with the mobile station, in accordance with the superior device, wherein the computer is made to function as the measurement report setter which notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and wherein the computer is made to function as the communication quality storage which transmits the number of measurement reports transmitted based on satisfaction of the first reporting condition and the number of measurement reports transmitted based on satisfaction of the second reporting condition, to the superior device.

An exemplary aspect of the program that makes a computer function as a base station provided for a radio communication system to perform radio communication with mobile stations via a cell managed thereby, causes the computer to function as a measurement report setter that notifies each mobile station that is connected thereto of reporting conditions for causing the mobile station to transmit a measurement report containing measurement results of the radio quality of the cell thereof and of each of neighboring cells adjacent to the subject cell, a communication quality storage that collects measurement reports transmitted from the mobile stations and notifies the collected statistical information to a superior device that manages its own base station, and a radio parameter controller that modifies, at least, one of the transmission power, the antenna tilt angle, and the decision timer used for determining whether any problem has occurred on the link with the mobile station, in accordance with the superior device, wherein the computer is made to function as the communication quality storage which transmits the reported number of measurement reports transmitted based on satisfaction of the reporting conditions and the number of times the radio quality reported by the measurement reports has become lower than the predetermined required quality, to the superior device.

An exemplary aspect of the program that makes a computer function as a base station provided for a radio communication system to perform radio communication with mobile stations via a cell managed thereby, causes the computer to function as a measurement report setter that notifies each mobile station that is connected thereto of reporting conditions for causing the mobile station to transmit a measurement report containing measurement results of the radio quality of the cell thereof and of each of neighboring cells adjacent to the subject cell, a communication quality storage that collects measurement reports transmitted from the mobile stations and notifies the collected statistical information to a superior device that manages its own base station, and, a mobile station information forwarder that transmits mobile station information for identifying mobile stations that are connected to the cell managed thereby, to a target base station that manages a cell to which the mobile stations are switched by handovers, at a predetermined timing, wherein the computer is made to function as the measurement report setter which notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and wherein the computer is made to function as the communication quality storage which transmits the number of measurement reports transmitted based on satisfaction of the first reporting condition and the number of measurement reports transmitted based on satisfaction of the second reporting condition, to the superior device.

An exemplary aspect of the program that makes a computer function as a base station provided for a radio communication system to perform radio communication with mobile stations via a cell managed thereby, causes the computer to function as a measurement report setter that notifies each mobile station that is connected thereto of reporting conditions for causing the mobile station to transmit a measurement report containing measurement results of the radio quality of the cell thereof and of each of neighboring cells adjacent to the subject cell, a communication quality storage that collects measurement reports transmitted from the mobile stations and notifies the collected statistical information to a superior device that manages its own base station, and a mobile station information forwarder that transmits mobile station information for identifying mobile stations that are connected to the cell managed thereby, to a target base station that manages a cell to which the mobile stations are switched by handovers, at a predetermined timing, wherein the computer is made to function as the communication quality storage which transmits the reported number of measurement reports transmitted based on satisfaction of the reporting conditions and the number of times the radio quality reported by the measurement reports has become lower than the predetermined required quality, to the superior device.

An exemplary aspect of the program that makes a computer function as a network management device managing a plurality of base stations, each performing radio communication with mobile stations via a cell, causes the computer to function as a cell pair detector that, when receiving the number of measurement reports that are transmitted from the base station based on satisfaction of the first reporting condition that causes the mobile stations to transmit a measurement report containing a measurement result of the radio quality for the cell managed by the base station that is connected to the mobile stations and of each of neighboring cells adjacent to the cell, to the base station, and the number of measurement reports transmitted from the base station based on satisfaction of the second reporting condition different from the first reporting condition, determines the probability of the measurement reports transmitted based on satisfaction of the second reporting condition, from the number of measurement reports transmitted based on satisfaction of the second reporting condition relative to the total number of measurement reports transmitted based on satisfaction of the first reporting condition and second reporting condition and detects a cell pair formed of the cell in combination with the neighboring cell whose radio quality falls lower than a predetermined value within a predetermined period when the probability exceeds a predetermined detection threshold, wherein the second reporting condition is that the offset value added to the measurement result of the radio quality is set to be greater than that of the first reporting condition and a guard time, that is a time from when the reporting condition is satisfied until the measurement report is transmitted, is set at a value shorter than that of the first reporting condition.

An exemplary aspect of the program that makes a computer function as a network management device managing a plurality of base stations, each performing radio communication with mobile stations via a cell, causes the computer to function as a cell pair detector that, when receiving the number of measurement reports that are transmitted from the base station based on satisfaction of the reporting conditions that cause the mobile stations to transmit a measurement report containing a measurement result of the radio quality for the cell managed by the base station that is connected to the mobile stations and of each of neighboring cells adjacent to the cell, to the base station, and the number of times the radio quality reported by the measurement report has become lower than the predetermined required quality, that determines the probability that the radio quality becomes lower than the required quality, from the reported number of measurement reports and the number of times the radio quality has become lower than the predetermined required quality, and, when the probability exceeds a predetermined detection threshold, that detects the cell pair as a cell pair formed of the cell in combination with the neighboring cell whose radio quality falls lower than a predetermined value within a predetermined period.

BRIEF DESCRIPTION OF DRAWINGS

FIG. 12 is a graph showing one example of statistic information stored in a network management device in the third exemplary embodiment.

FIG. 14 is a graph showing one example of statistic information on radio quality stored in a network management device in the fourth exemplary embodiment.

FIG. 16 is a sequence diagram showing one operation example of a radio communication system of the fifth exemplary embodiment.

EXEMPLARY EMBODIMENT

Next, the present invention will be described with reference to the drawings.

The First Exemplary Embodiment

In the first exemplary embodiment, based on the measurement reports from individual mobile stations, mobile stations that are sharply lowered in the radio quality with the source cell is detected. The source base station, as it detects such a mobile station, immediately transmits a handover request to start a handover process to the target base station that manages the target cell of the detected mobile station. In the first exemplary embodiment, two kinds of reporting conditions are configured for measurement reports to be transmitted from each mobile station to the source base station.

Here, in the first exemplary embodiment, as a radio communication system, the wireless cellular system that supports LTE is assumed. This point is the same for all of the second to fifth exemplary embodiments.

Figure 3:
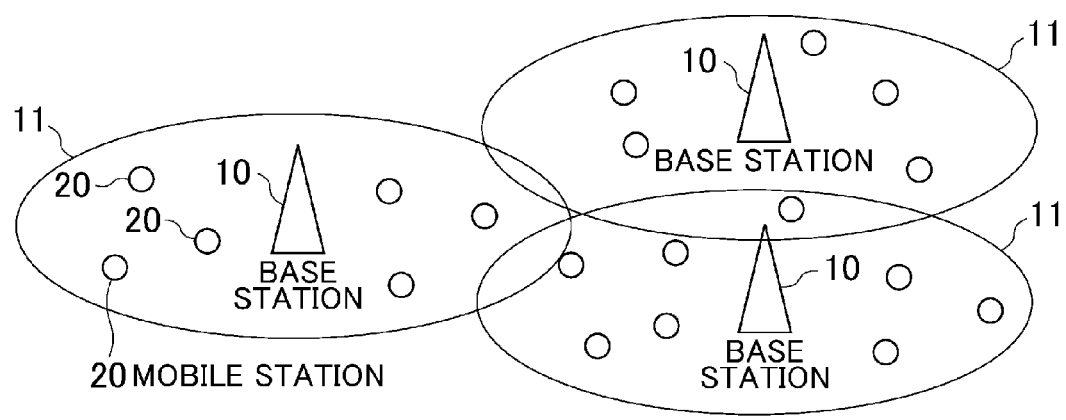
FIG. 3 is a block diagram showing one configurational example of a radio communication system of the first exemplary embodiment.

FIG. 3 is a block diagram showing one configurational example of a radio communication system of the first exemplary embodiment.

As shown in FIG. 3, the radio communication system of the first exemplary embodiment includes a plurality of base stations 10 and a plurality of mobile stations 20. Each base station 10 manages one or more cells 11. Mobile station 20 establishes wireless connection with a base station 10 that manages the cell 11 under which the mobile station is residing, to thereby be able to perform bi-directional radio communication with the base station 10.

Base station 10 is connected an unillustrated superior network and relays traffic between mobile stations 20 and the superior network. The superior networks include radio access networks and core networks. Base stations 10 may include relay base stations and the like that relay radio signals.

Although FIG. 3 shows a configurational example in which the radio communication system includes three base stations 10, the radio communication system may include any number of base stations 10. Further, although FIG. 3 shows a configurational example in which each base station 10 manages only a single cell 11, base station 10 may manage a plurality of cells.

Figure 4:
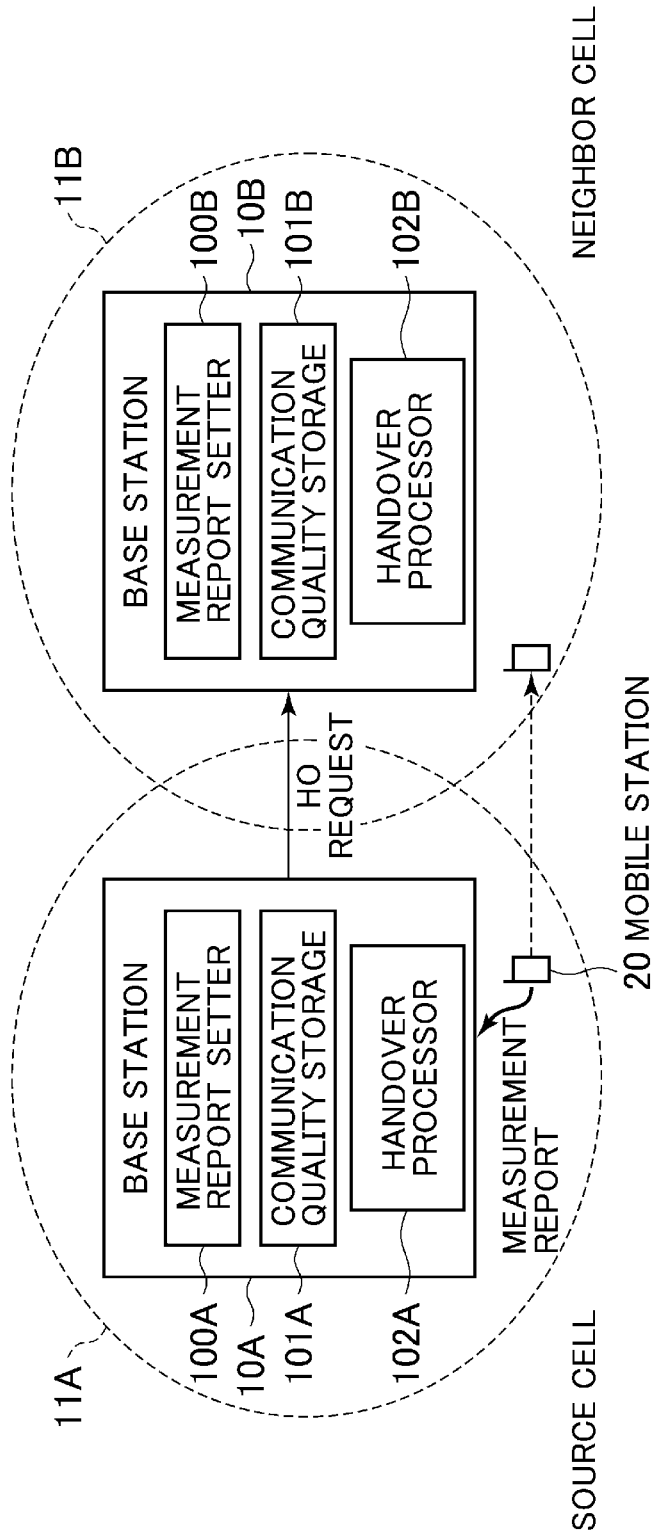
FIG. 4 is a block diagram showing one configuration al example of a base station of the first exemplary embodiment.

FIG. 4 is a block diagram showing one configurational example of the base station of the first exemplary embodiment.

In FIG. 4, the base station managing source cell 11A is allotted with reference numeral 10A while the base station managing neighbor cell (target cell) 11B is allotted with reference numeral 10B. The base stations 10 shown in FIG. 3 all have the same configuration, and each base station functions as base station 10A shown in FIG. 4 when operating as a source base station, whereas each base station functions as base station 10B shown in FIG. 4 when operating as a target base station.

As shown in FIG. 4, base station 10A includes measurement report setter 100A, communication quality storage 101A and handover processor 102A. Base station 10B includes measurement report setter 100B, communication quality storage 101B and handover processor 102B. Base station 10A and base station 10B are configured so as to be able to exchange information via a well-known communication interface. For example, in the case of LTE, base station 10A and base station 10B exchange necessary information using the X2 interface as a cabled interface.

Measurement report setter 100A determines the reporting condition that causes each mobile station 20 that is connected to its own base station, to send a measurement report. The reporting conditions include the type (event type) of a supporting measurement report, values of used parameters (A3 offset, CIO, TTT). A3 offset is the aforementioned offset parameter Off used for event A3. In LTE, measurement reports for events A1 to A6, B1 to B2 are defined in accordance with measurement indexes (see Non-patent Document 1). For example, event A3 used for handover is an event that sends a measurement report when the radio quality of the neighbour cell has become better than the radio quality of the source cell.

Communication quality storage 101A stores the measurement report transmitted from each mobile station 20 and outputs the measurement reports for every mobile station 20 to handover processor 102A.

Handover processor 102A, based on the measurement report from communication quality storage 101A, determines whether or not each mobile station 20 requires handover, and transmits a handover request of the mobile station 20 to base station 10B that manages target cell 11B if handover is needed. Base station 10B having received the handover request determines whether or not the handover request should be approved, by means of handover processor 102B, and sends back the determined result to base station 10A.

Measurement reporting setter 100A, communication quality storage 101A and handover processor 102A provided for base station 10A shown in FIG. 4, can be realized by means of an information processing device (computer) including, for example memories, various logic circuits and a CPU or the like that executes predetermined procedures in accordance with control programs. The CPU executes the procedures in accordance with the control programs to thereby realize the functions of measurement reporting setter 100A, communication quality storage 101A and handover processor 102A. Measurement reporting setter 100B, communication quality storage 101B and handover processor 102B provided for base station 10B shown in FIG. 4 can also be operated in the same manner.

Next, the operation of the radio communication system of the first exemplary embodiment will be described with reference to FIG. 5.

Figure 5:
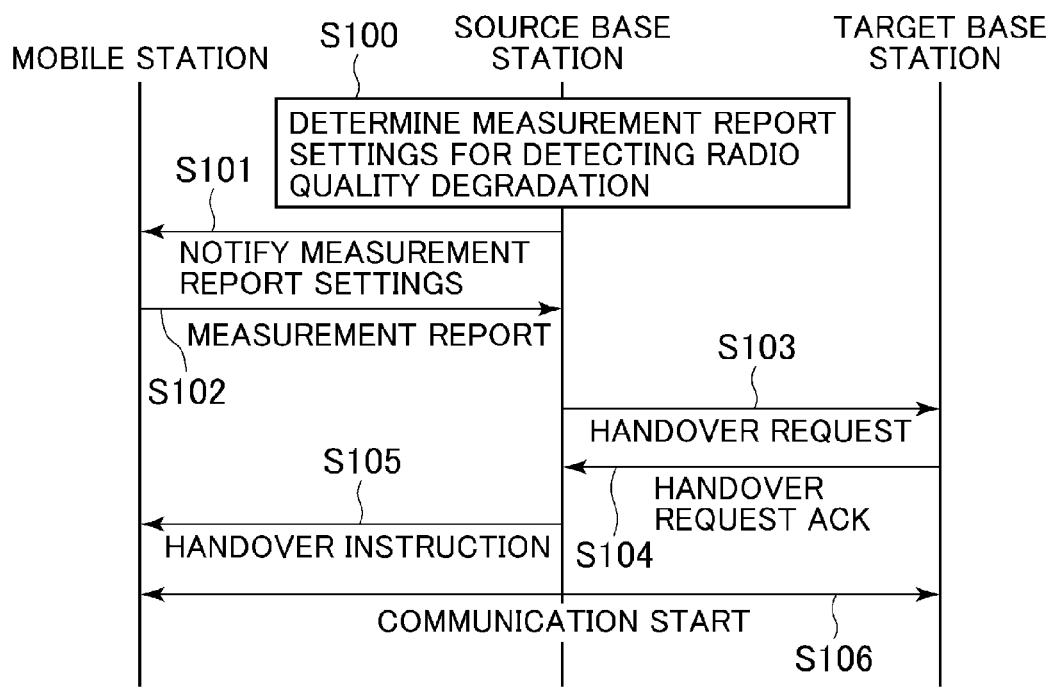
FIG. 5 is a sequence diagram showing one operation example of a radio communication system of the first exemplary embodiment.

FIG. 5 is a sequence diagram showing one operation example of the radio communication system of the first exemplary embodiment.

As shown in FIG. 5, base station 10A (which will be referred to hereinbelow as source base station) first determines two types of reporting conditions, which are set in all mobile stations 20 within the source cell managed by the base station to cause the mobile station to send a measurement report (Step S100).

The reporting conditions to be set in each mobile station 20 will be described with reference to FIG. 6.

Figure 6:
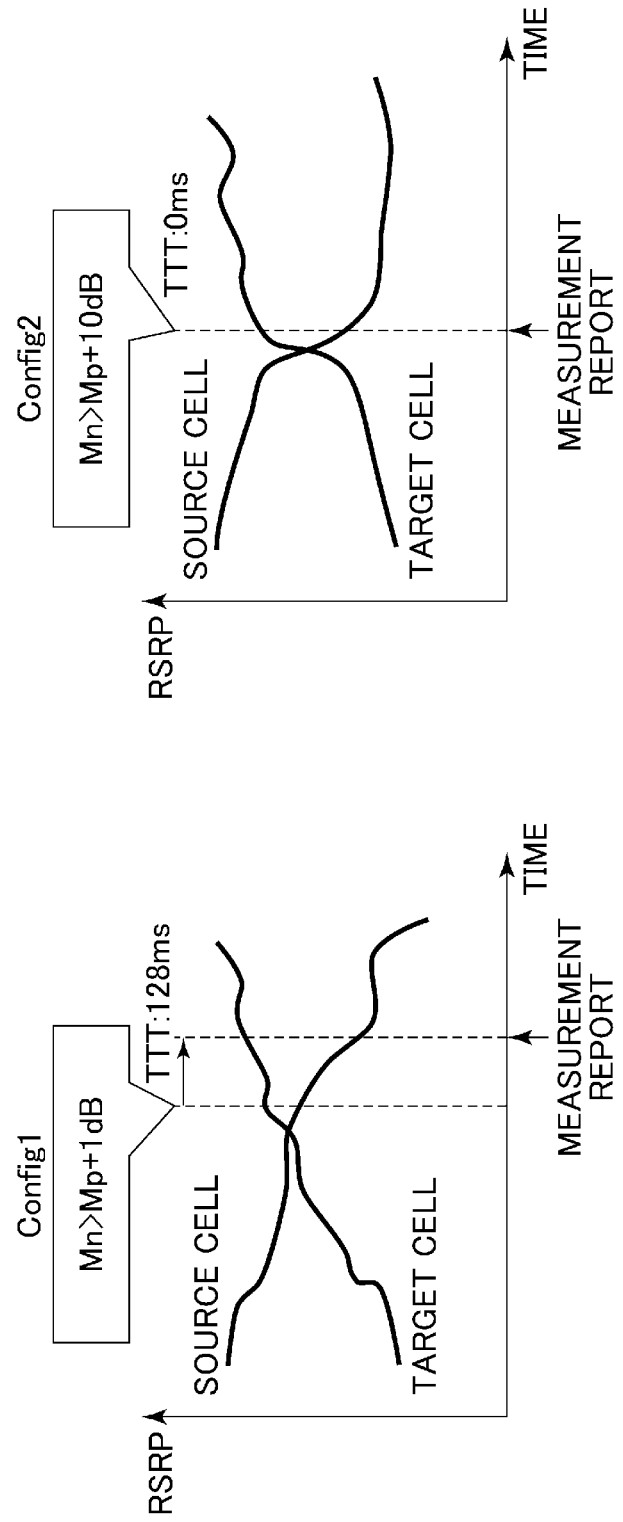
FIG. 6 is a graph schematically showing two kinds of reporting conditions used in the first exemplary embodiment.

FIG. 6 is a graph schematically showing two types of reporting conditions used in the first exemplary embodiment.

In the first reporting condition (Config1), the parameter used for Event A3 is set at an ordinary value used for evaluation of handover, defined by the 3GPP technical specifications (Non-patent Document 3). In the second reporting condition (Config2), the parameter used for Event A3 is set at a value that enable significant degradation of the radio quality (RSRP).

In this case, when the offset parameter Off set as the first reporting condition is denoted by Off1, the guard time TTT by TTT1, the offset parameter Off set as the second reporting condition by Off2 and the guard time TTT by TTT2, these parameters are configured so as to meet the following expressions (3) and (4):

$$Off1 \ll Off2 \quad (3)$$

$$TTT1 \gg TTT2 \quad (4)$$

For example, in the first reporting condition, Off1 is set at 1 dB and TTT1 is set at 128 milliseconds. The first reporting condition is a reporting condition assuming the case where a mobile station 20 whose radio quality (RSRP) is not expected to change sharply will send a measurement report when the above Ex. (1) is satisfied. In the second reporting condition, Off2 is set at a greater value than that of the first reporting condition, for example at 10 dB while TTT2 is set at a smaller value than that of the first reporting condition, for example at 0 milliseconds. With the settings of the second reporting condition, mobile station 20 will send a measurement report to source base station 10A immediately (TTT2=0) when a significant degradation of the radio quality (RSRP) of the source cell is detected.

The above Off and TTT values set for the first reporting condition and the second reporting condition can be set freely as long as the above Exs. (3) and (4) are satisfied. Though the example shown herein is a case where Off 2 is set at a greater value than Off1, CIO defined by the above Ex. (2) may be, instead, set at a smaller value.

Next, source base station 10A notifies the first and second reporting conditions determined at Step S100 to every mobile station 20 connected thereto (Step S101). Mobile station 20 measures the radio quality (RSRP, RSRQ) and sends a measurement report to source base station 10A when at least one of the first reporting condition and the second reporting condition is satisfied (Step S102).

Source base station 10A determines the target cell based on the measurement report transmitted from mobile station 20 and sends a handover request to base station 10B that manages the target cell (which will be referred to hereinbelow as target base station). At this time, whichever, the first reporting condition or the second reporting condition, caused the mobile station to send the received measurement report, source base station 10A sends a handover request to target base station 10B (Step S103). Here, mobile station 20 sends the measurement report including an identifier for identification of the reporting condition so that source base station 10A can distinguish which condition, the first condition or the second condition, was satisfied in sending the measurement report. Source base station 10A, when receiving a measurement report based on the second reporting condition, transmits a handover request that is results from detection of a sharp degradation of radio quality, to target base station 10B.

When receiving the handover request, target base station 10B determines whether or not the handover request should be approved. If it is approved, the target base station returns an acknowledge for handover request (Handover Request ACK) to source base station 10A (Step S104). Target base station 10B returns a negative acknowledge for handover request (Handover Request NACK) to source base station 10A when, for example, the processing load on its own station is high and hence the user throughput of base stations 20 connected thereto will degrade.

Source base station 10A having received an acknowledge for the handover request sends a handover command to instruct mobile station 20 to start a handover process (Step S105). The message of the handover command includes the cell ID of the target cell, the ID of the mobile station 20 and others.

Mobile station 20 having received the handover command switches its access from the source cell to the target cell and thereafter continues communication with the superior network via the target cell (Step S106).

Figure 1A:
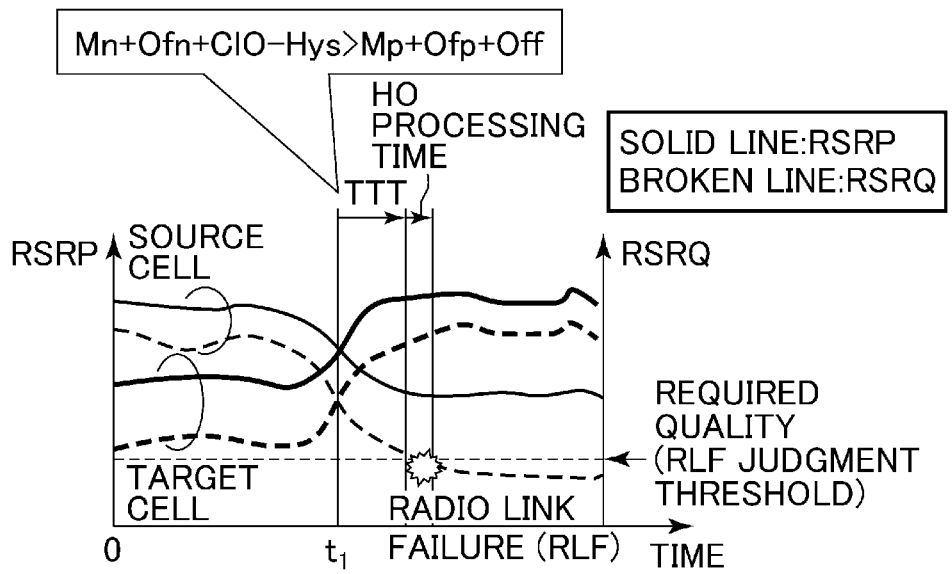
FIG. 1 is a graph schematically showing the reason why the occurrence of handover failures is reduced by adjusting handover parameters (CIO).
Figure 1B:
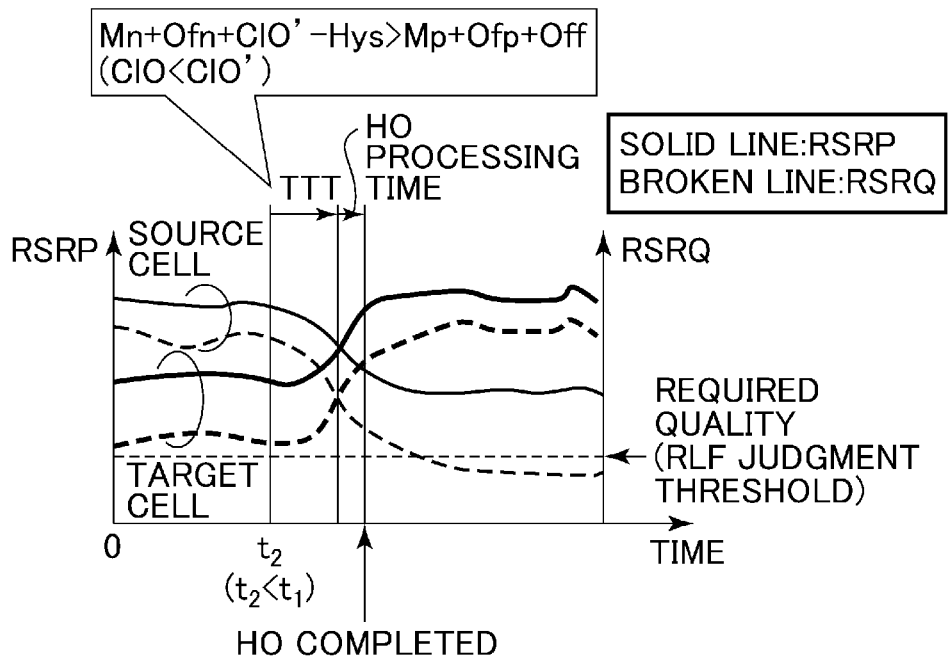
Figure 2:
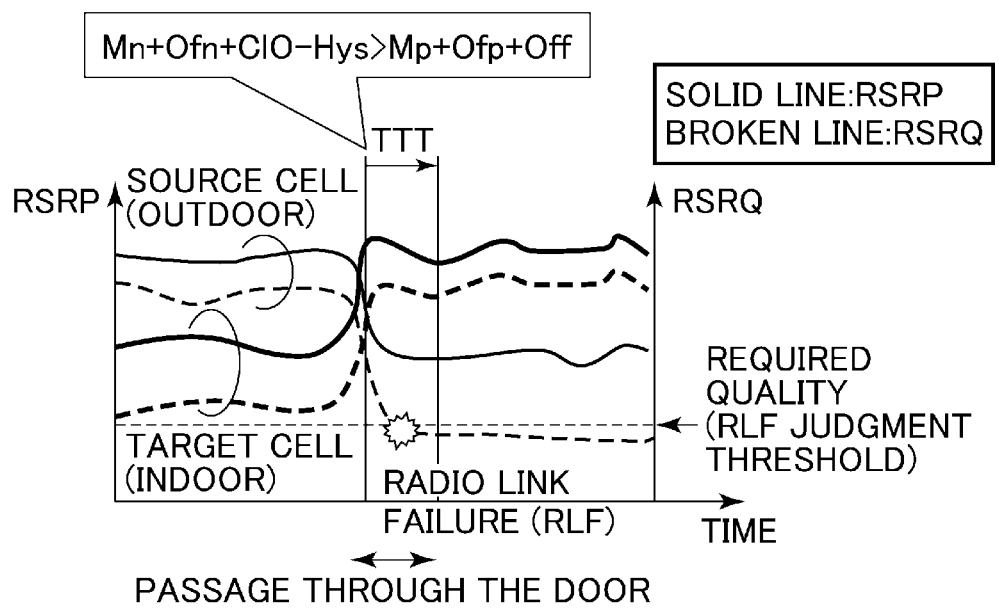
FIG. 2 is a graph schematically showing the mechanism of change of the radio quality (RSRP, RSRQ) of a mobile station moving from an outdoor cell to an indoor cell.

According to the first exemplary embodiment, a reporting condition (the second reporting condition) is configured in each mobile station 20, which makes mobile stations transmit a measurement report to source base station 10A immediately when a significant degradation of radio quality is detected in the source cell. Accordingly, when receiving the measurement report, from mobile station 20, based on the second reporting condition, source base station 10A immediately transmits a handover request for the mobile station 20 to target base station 10B. Therefore, no RLF due to RSRQ degradation will occur before mobile station 20 transmits a measurement report, as in the background art shown with FIG. 2. As a result, it is possible to reduce the occurrence of handover failures and shorten the time of temporary disruption of communication.

Though the first exemplary embodiment was described by giving a configurational example in which each base station 10 includes a measurement report setter, a communication quality storage and a handover processor, the object of the present invention (helping to reduce temporary disruption time of communication accompanying handover) can be achieved if each base station 10 includes a measurement report setter and a handover processor. After all, as long as each base station 10 includes a measurement report setter and a handover processor, the operation and effect can be achieved to solve the problem of the invention.

The Second Exemplary Embodiment

The above first exemplary embodiment was described by giving an example where mobile station 20 is made to transmit a measurement report by using two types of reporting conditions. In the second exemplary embodiment, one type of reporting condition is defined while the mobile station 20 that has transmitted a measurement report based on that reporting condition is made to report a measurement result of radio quality, periodically to thereby detect sharp degradation of radio quality. Since the configuration of the radio communication system is the same as that of the first embodiment, its description is omitted herein.

Figure 7:
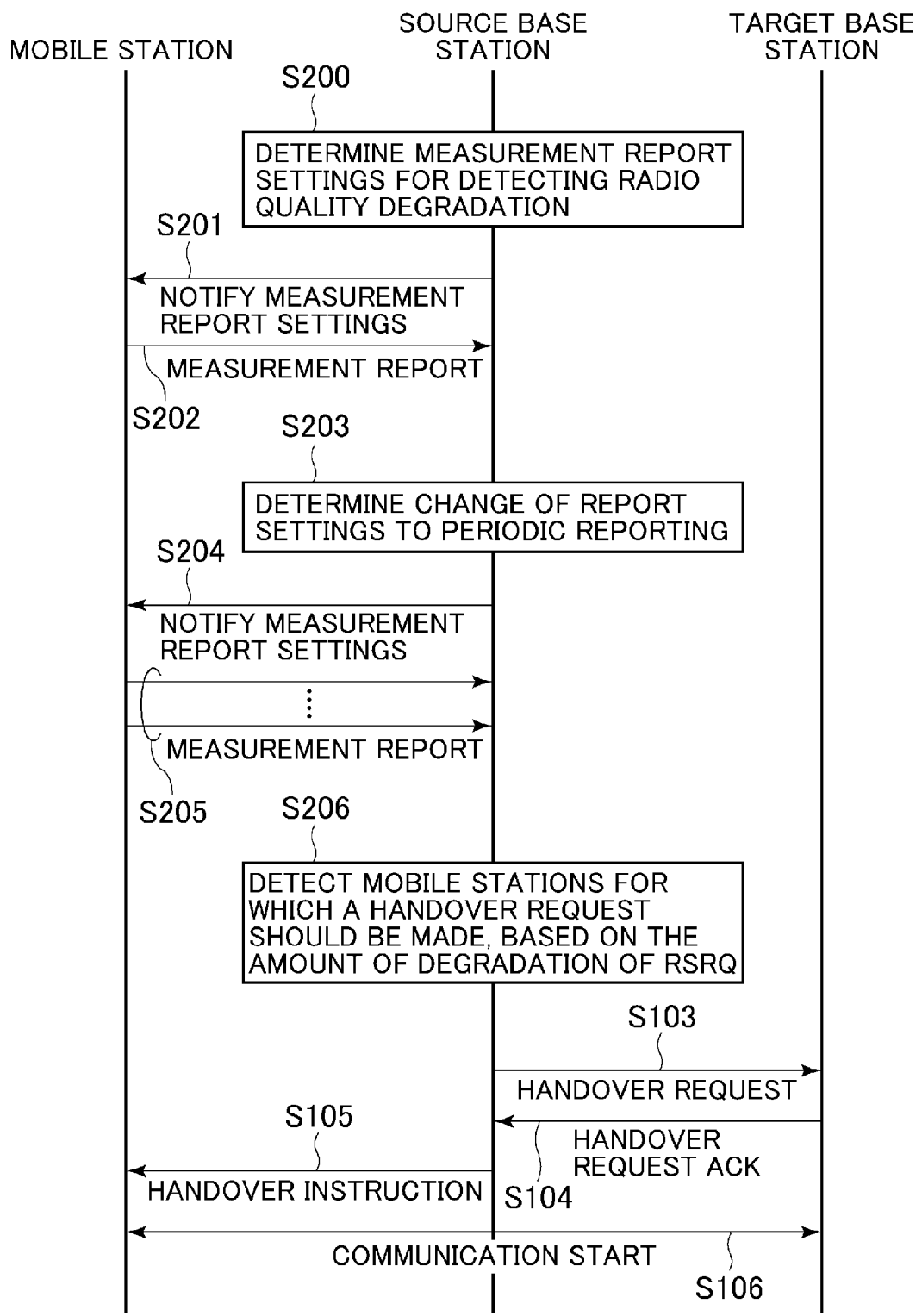
FIG. 7 is a sequence diagram showing one operation example of a radio communication system of the second exemplary embodiment.
Figure 8:
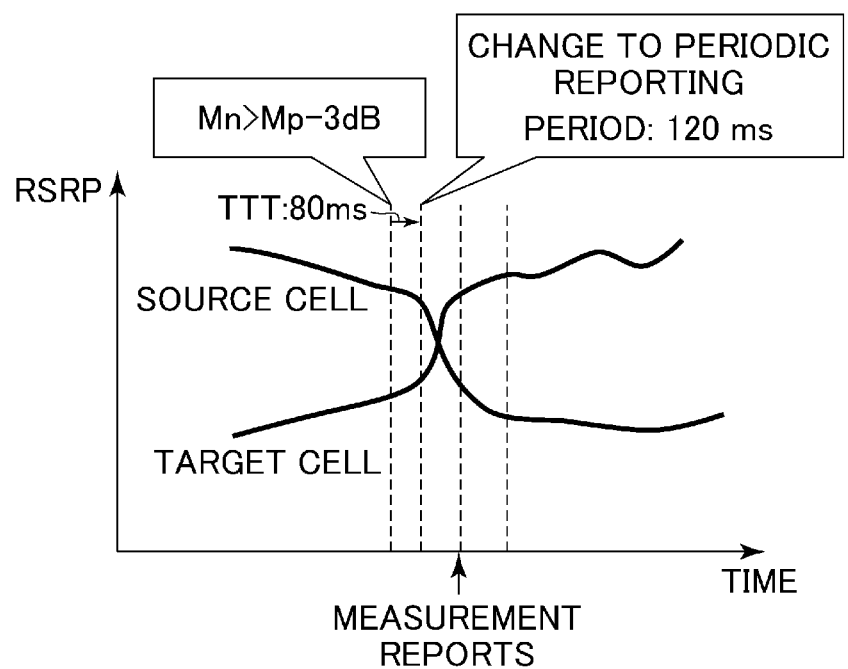
FIG. 8 is a graph schematically showing a reporting condition used in the second exemplary embodiment.

FIG. 7 is a sequence diagram showing one example of the operation of the radio communication system of the second exemplary embodiment. FIG. 8 is a graph schematically showing the reporting condition used in the second embodiment.

As shown in FIG. 7, first of all, source base station 10A determines a reporting condition to be set for all the mobile stations 20 in the source cell (Step S200). Herein, in order for mobile stations 20 to send a measurement report before the radio quality sharply degrades, offset parameters Off and TTT are set at smaller values than the ordinary values shown above for the first reporting condition. For example, offset parameter Off is set at −3 dB and TTT at 80 milliseconds. It should be noted that the above Off and TTT values that are set as the reporting condition may be set at any value as long as it is possible to "send a measurement report before the radio quality sharply degrades". Though the example herein is given by setting a small value for offset parameter Off, the CIO defined in the above Ex. (2) may be set a large value, instead.

Next, source base station 10A notifies the reporting condition determined at Step S200 to all the mobile stations 20 managed thereby (Step S201). When the reporting condition notified from source base station 10A is satisfied, mobile station 20 transmits a measurement report to source base station 10A (Step S202).

Source base station 10A, upon receiving the measurement report from a mobile station 20, determines change of the reporting condition for the mobile station 20 (Step S203). As shown in FIG. 8, for example, the base station determines the reporting condition defined in the above Ex. (1) (which will be referred to hereinbelow as event reporting condition) at Step S200 and determines the reporting condition that causes the mobile stations to send a measurement result of radio quality (RSRQ) for every predetermined period (which will be referred to hereinbelow as periodic reporting condition) at Step S203. Here, it should be noted that the measurement report based on the periodic reporting condition (which will be referred to hereinbelow as period report) is preferably sent at intervals of a short period (e.g., 120 milliseconds or the like) so as to enable detection of sharp degradation of radio quality.

Source base station 10A notifies the modified reporting condition determined at Step S203 to mobile station 20 (Step S204). The mobile station 20 upon receiving the modified reporting condition transmits a measurement result of radio quality at intervals of the predetermined period in accordance with the reporting condition (Step S205). In this case, in order to detect mobile station 20 that is experiencing sharp degradation of the radio quality due to change of radio quality, at least one measurement report based on the periodic reporting condition (which will be referred to hereinbelow as periodic report) other than the measurement report based on the event reporting condition (which will be referred to hereinbelow as event report) is needed.

Source base station 10A detects mobile stations 20 that require handover, based on the amount of degradation of the radio quality (RSRQ) reported at a predetermined cycle (Step S206). Source base station 10A compares the latest RSRQ with the previously reported RSRQ and judges that RSRQ has degraded when the latest RSRQ is smaller. Based on this judgment, the difference between the previously reported RSRQ and the latest RSRQ is regarded as the amount of degradation. Source base station 10A determines that the radio quality has sharply degraded when the amount of RSRQ degradation is greater than a predetermined value, and decides handover of the mobile station 20 to the target cell. The following procedures for handover to the target cell (Steps S103 to S106) are the same as in the first exemplary embodiment shown in FIG. 5, so description is omitted herein.

Here, in order to avoid unnecessary measurement reports from mobile stations 20 to source base station 10A, it is preferable for source base station 10A to return reporting condition for mobile stations 20 that have an RSRQ level greater than a predetermined threshold, from the period reporting condition to the event reporting condition.

Although the above description was made by giving an example where a reporting condition is changed to the periodic reporting condition by triggering an event report from mobile station 20, the reporting condition may be changed to the periodic reporting condition only for mobile stations 20 whose radio quality is lower than a predetermined value, based on the measurement report obtained from the event report.

According to the second embodiment, a reporting condition for is changed into the period reporting condition by triggering the sending of an event report so as to detect sharp deterioration of the radio quality of mobile station 20 from the change of the periodically reported ratio quality. Accordingly, since it is sufficient to set only one type of reporting condition in each mobile station 20, it is hence possible to reduce the amount of signaling for reporting conditions notified from source base station 10A to mobile stations 20, compared to that in the first exemplary embodiment.

Although the second exemplary embodiment was described by giving a configurational example in which each base station 10 includes a measurement reporting setter, a communication quality storage and a handover processor, similar to the first exemplary embodiment the object of the present invention (helping to reduce temporary disruption time of communication accompanying handover) can be achieved as long as each base station 10 includes a measurement report setter and a handover processor. After all, as long as each base station 10 includes a measurement report setter and a handover processor, the operation and effect can be achieved to solve the problem of the invention.

The Third Exemplary Embodiment

The above first and second exemplary embodiments were described by giving examples in which the source base station detects a mobile station that is experiencing sharp degradation of radio quality based on the measurement report notified from each mobile station and performs a handover process for the mobile station. In the third exemplary embodiment, the measurement results of radio quality notified from every mobile station are statistically processed so as to detect a cell pair that is experiencing sharp degradation of radio quality, based on the statistic information. In addition, in the third exemplary embodiment, radio parameters such as transmission power, antenna tilt angle or the like of the detected cell pair are adjusted so as to inhibit occurrence of handover failure of the mobile station from the source cell to the target cell of the cell pair.

Figure 9:
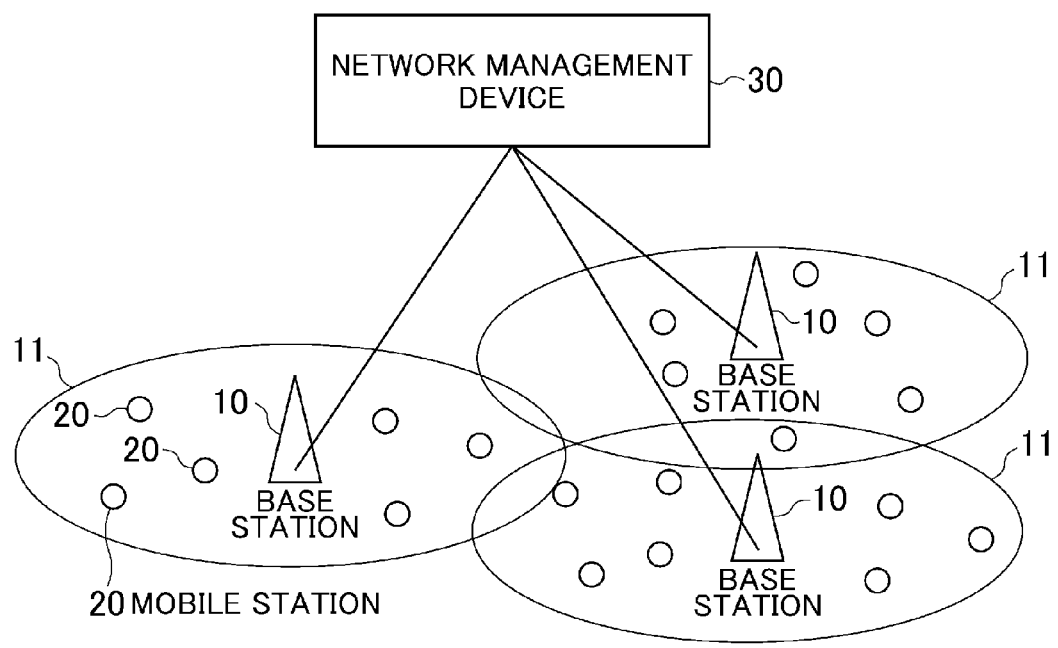
FIG. 9 is a block diagram showing one configurational example of a radio communication system of the third exemplary embodiment.

FIG. 9 is a block diagram showing one configurational example of a radio communication system of the third exemplary embodiment.

As shown in FIG. 9, the radio communication system of the third exemplary embodiment has the configuration of the radio communication system of the first exemplary embodiment shown in FIG. 3, further including network management device 30 for managing a plurality of base stations 10.

Base station 10 of this exemplary embodiment statistically processes the measurement results of radio quality notified from individual mobile stations 20 in the cell managed thereby and notifies the processed result, i.e., the statistic information, to network management device 30. Network management device 30, based on the statistic information notified from base station 10, detects a cell pair whose radio quality is being sharply degraded. Network management device 30 also adjusts the radio parameter (e.g., transmission power) of base station 20 of the detected cell pair to inhibit occurrence of handover failure of the cell pair.

Figure 10:
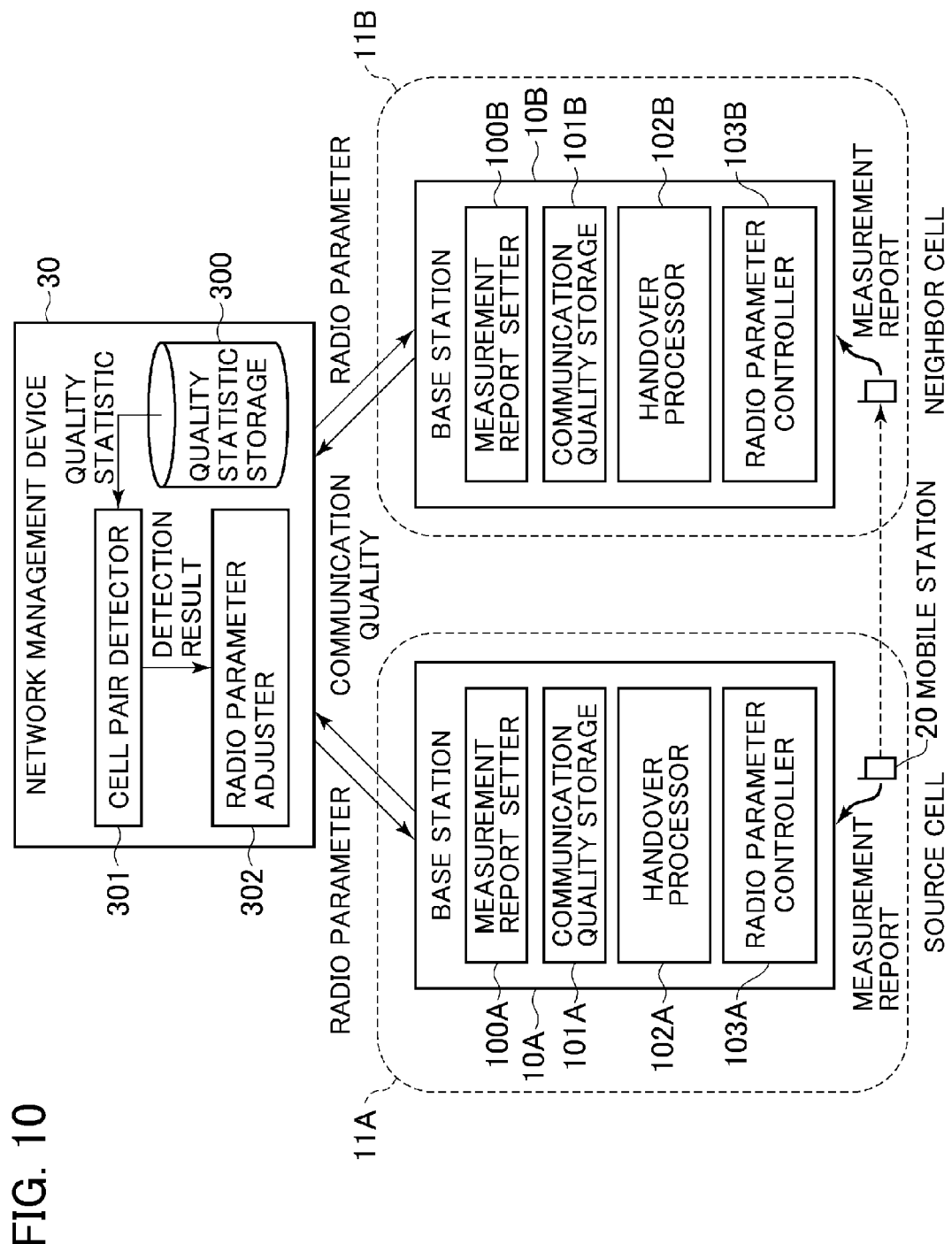
FIG. 10 is a block diagram showing one configurational example of base stations and a network management device of the third exemplary embodiment.

FIG. 10 is a block diagram showing one configurational example of base stations and a network management device of the third exemplary embodiment.

In FIG. 10, the base station that manages source cell 11A is allotted with reference numeral 10A while the base station managing neighbor cell (target cell) 11B is allotted with reference numeral 10B. The base stations 10 shown in FIG. 9 all have the same configuration, and each base station functions as base station 10A shown in FIG. 10 when operating as a source base station, whereas each base station functions as base station 10B shown in FIG. 10 when operating as a target base station.

As shown in FIG. 10, base station 10A of the third exemplary embodiment includes measurement report setter 100A, communication quality storage 101A, handover processor 102A and radio parameter controller 103A. Base station 10B includes measurement report setter 100B, communication quality storage 101B, handover processor 102B and radio parameter controller 103B. Base station 10A and base station 10B are configured so as to be able to exchange information via a well-known communication interface. For example, in the case of LTE, base station 10A and base station 10B exchange necessary information using the X2 interface as a cabled interface.

Communication quality storage 101A stores the measurement reports sent from individual mobile stations 20 in source cell 11A and collects these values and reports the collected statistical information on radio quality to network management device 30 at a predetermined cycle.

Radio parameter controller 103A adjusts radio parameters in accordance with the instructions from network management device 30. As a radio parameter to be adjusted, for example, transmission power may be used. The radio parameter to be adjusted should not be limited to transmission power. For example, the antenna tilt angle, the RLF decision timer (T310) or the like may be used. The RLF decision timer (T310) is a decision timer to be used to determine whether or not any failure has taken place on the radio link between mobile station 20 and base station 10.

Similar to the first exemplary embodiment shown in FIG. 4, handover process 102A determines, based on the measurement report received from communication quality storage 101A, whether or not each mobile station 20 needs a handover, and transmits a handover request for the mobile station 20 to base station 10B managing target cell 11B if handover is needed. Base station 10B having received the handover request determines whether or not the handover request should be approved, by means of handover processor 102B, and sends back the determined result to base station 10A.

As shown in FIG. 10, network management device 30 includes quality statistic storage 300, cell pair detector 301 and radio parameter adjuster 302. Network management device 30 is configured to be able to exchange information with base station 10A and base station 10B via a well-known interface.

Quality statistic storage 300 stores statistical information on radio quality reported from source base station 10A and outputs the statistical information to cell pair detector 301.

Cell pair detector 301 detects a cell pair whose radio quality has sharply degraded, based on the statistical information on radio quality, and outputs the detected result to radio parameter adjuster 302.

Radio parameter adjuster 302 determines a radio parameter to be adjusted in the cell pair detected by cell pair detector 301 and transmits modification instructions of the radio parameter to source base station 10A.

Measurement reporting setter 100A, communication quality storage 101A, handover processor 102A and radio parameter controller 103A, provided for base station 10A shown in FIG. 10, can be realized by means of an information processing device (computer) including, for example memories, various logic circuits and a CPU or the like that executes predetermined procedures in accordance with control programs. The CPU executes the procedures in accordance with the control programs to thereby realize the functions of measurement reporting setter 100A, communication quality storage 101A and radio parameter controller 103A. Measurement reporting setter 100B, communication quality storage 101B, handover processor 102B and radio parameter controller 103B, provided for base station 10B shown in FIG. 10 can also be operated in the same manner.

Further, quality statistic storage 300, cell pair detector 301 and radio parameter adjuster 302, provided for network management device 30 shown in FIG. 10 can also be realized by means of an information processing device (computer) including a CPU or the like that executes predetermined procedures in accordance with, for example memories, various logic circuits and control programs.

Figure 11:
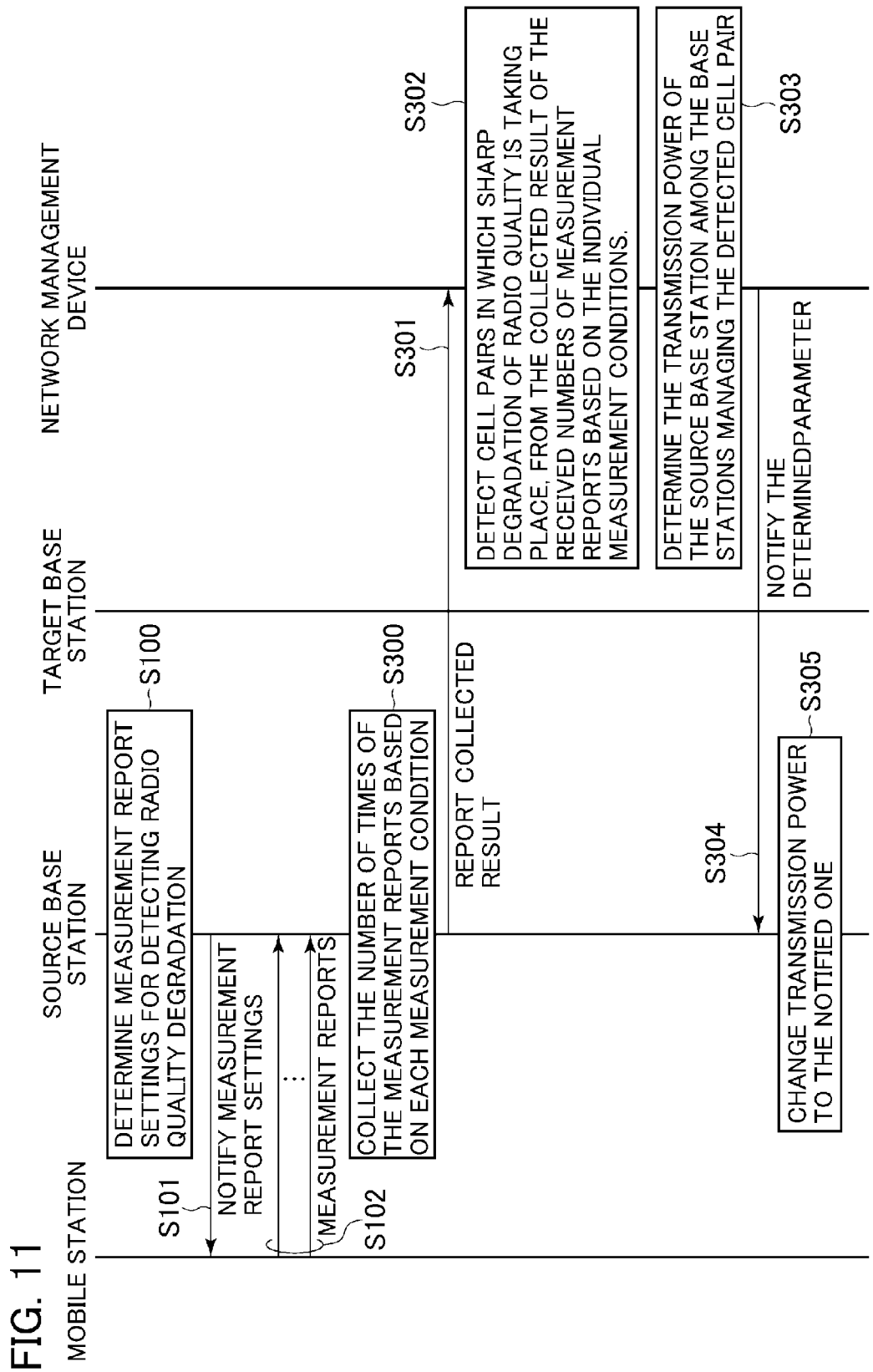
FIG. 11 is a sequence diagram showing one operation example of a radio communication system of the third exemplary embodiment.

FIG. 11 is a sequence diagram showing one operation example of the radio communication system of the third exemplary embodiment.

The procedures from Steps S100 to S102 shown in FIG. 11 are the same as those of Steps 100 to S102 in the first exemplary embodiment shown in FIG. 5, so description is omitted herein. However, in the third exemplary embodiment, in order to perform a statistic process on measurement reports, source base station 10A needs to receive measurement reports from multiple mobile stations 20 at Step S102.

In the radio communication system of the third exemplary embodiment, similar to the first exemplary embodiment, two types of reporting conditions are set up to send a measurement report. In first reporting condition (Config1), the parameter used for Event A3 is set at an ordinary value used for evaluation of handover, defined by the 3GPP technical specifications (Non-patent Document 3). In the second reporting condition (Config2), the parameter used for Event A3 is set at a value that enables significant degradation of radio quality (RSRP).

Source base station 10A, as receiving measurement reports from multiple base stations 20, generates statistical information on ratio quality by collating the reports (Step S300). The statistical information on ratio quality includes the received numbers of measurement reports based on each of the first reporting condition (Config1) and the second reporting condition (Config2), within a predetermined period.

Next, source base station 10A notifies the statistical information on radio quality generated at Step S300 to network management device 30 (Step S301). At this time, source base station 10A notifies the statistical information to network management device 30 at a predetermined cycle.

Network management device 30, based on the statistical information notified from source base station 10A, detects cell pairs in which radio quality has sharply degraded (Step S302). In the present exemplary embodiment, the received numbers of measurement reports based on the first and second reporting conditions are totalized for each pair. Then, the pairs presenting a high probability of occurrence of the measurement reports based on the second reporting condition relative to the total received number of measurement reports are detected as the cell pairs with radio quality sharply degraded.

Whether or not a cell pair whose radio quality has been sharply degraded can be detected by determining whether or not the following Ex. (5) is satisfied.

$$P_{m,n} > P_{th} \quad (5)$$

Herein, $P_{m,n}$ is the probability of the measurement reports transmitted when the second reporting condition is satisfied for the cell pair of cell #m and #n, whereas $P_{th}$ is the detection threshold. Specifically, when the probability of measurement reports based on the second report condition is higher than detection threshold $P_{th}$, it is determined that the radio quality has been sharply degraded.

FIG. 12 is a graph showing one example of statistical information stored in the network management device of the third exemplary embodiment.

As shown in FIG. 12, the statistical information of the present exemplary embodiment, contains, for each cell pair, the number of measurement reports (the total number of measurement reports), the number of measurement reports based on the first reporting condition (Config1) and the number of measurement reports based on the second reporting condition (Config2). Since, in measurement reporting based on Event A3, radio quality is reported for each neighboring cell that forms a cell pair with the source cell, the numbers of measurement reports is collected and stored for every cell pair.

As detection threshold $P_{th}$ is assumed to be 50% in this case, the probability of measurement reports based on the second reporting condition for the cell pair of cell #0 (source cell) and cell #1 is 60/100×100=60%, which satisfies the condition specified by the above Ex. (5). As described above, in the second reporting condition, the parameter to be used for Event A3 is set at a value that enables significant degradation of radio quality (RSRP). Accordingly, in the example shown in FIG. 12, it is found that a lot of mobile stations 20 connected to the source cell (cell #0) are experiencing sharp degradation of radio quality.

Next, network management device 30 determines the transmission power after adjustment for source base station 10A that manages the source cell of the detected cell pair (Step S303). Specifically, the transmission power of the source base station 10A is increased by a step size, which is a predetermined adjustment unit. Herein, the step size is set at 1 dB, for instance. The step size may take another value.

In the third exemplary embodiment, the process from Steps S300 to S305 shown in FIG. 11 is repeated so as to set the transmission power of source base station 10A at the optimal value.

Next, description will be made on the reason for increasing the transmission power of source base station 10A.

When the above second reporting condition is satisfied at mobile station 20, the radio quality of the source cell connected to the mobile station 20 is in a significantly degraded state compared to the radio quality of the target cell. That is, it is expected that, due to degradation of the radio quality (RSRQ) of the source cell, radio link failure (RLF: Radio Link Failure) will take place thus causing handover failure (Too Late handover).

To deal with this situation, by increasing the transmission power of source base station 10A, the radio quality (RSRQ) of the source cell is improved. Increase of the transmission power of source base station 10A is enough if, for example, it is increased to the level at which no RLF will occur at mobile station 20. As the transmission power of the source base station 10A is increased, the difference in radio quality between the source cell and the target cell becomes smaller, so that the number of times the second report condition is satisfied decreases.

Although the above description was made by giving an example in which the transmission power of source base station 10A is increased to prevent occurrence of RLF at mobile station 20, the transmission power of target base station 10B that manages the target cell may be lowered to avoid occurrence of RLF at mobile station 20. Combining this lowering process of the transmission power of target base station 10B with the process of increasing the transmission power of source base station 10A makes it possible to control the transmission power of one base station 10 that manages the desired cell of the two cells that form a cell pair.

For example, when two cells such as a pico cell and femtocell that form a cell pair, have a different size (coverage) from each other, it is preferable that the transmission power of the cell having a smaller coverage is modified. The reason is that it is thought that the cell that has a smaller coverage has a lower number of mobile stations connected thereto so that less influence is brought to all the mobile stations 30 that use the cell pair. Combined use of the process of increasing the transmission power of source base station 10A and the process of lowering the transmission power of target base station 10B makes it possible to select the cell having the smaller coverage as to the cell whose transmission power is to be adjusted.

Although the above description was made by giving an example in which the transmission power of source base station 10A or target base station 10B is adjusted, the radio parameter to be adjusted may be, for example the tilt angle, the decision timer (T310) or the like, as stated above.

When the tilt angle is adjusted, the antenna may be tilted up (the main radiation surface is directed to the sky to enlarge the radio wave radiating area) instead of increasing transmission power and may be tilted down (the main radiation surface is directed to the ground to reduce the radio wave radiating area) instead of decreasing transmission power. Similar to adjustment of transmission power, the process from Steps S300 to S305 shown in FIG. 11 is repeated to set the antenna tilt angle of base station 10 at the optimal value.

When the decision timer (T310) is adjusted, the set value of the decision timer (T310) may be made smaller so as to shorten the re-connection time upon a handover failure instead of increasing or reducing transmission power, to urge connection re-establishment. Though the above description was given by mentioning examples in which one of the transmission power, the antenna tilt angle and the decision timer (T310) is adjusted in source base station 10A or target base station 10B, two or more radio parameters may be used in combination for adjustment. Combined adjustment of multiple radio parameters makes it possible to adjust each parameter by a small amount.

Further, although the above description was given by illustrating examples in which the radio parameter is adjusted in either source base station 10A or target base station 10B, the radio parameter may also be adjusted in both the source base station 10A and target base station 10B sides. For example, when the transmission power of source base station 10A is increased while the transmission power of target base station 10B is lowered, the amount of adjustment for each can be made smaller.

Network management device 30, after determining the adjusted radio parameter value (herein the transmission power of the source base station), notifies source base station 10A of the radio parameter information containing the radio parameter value after adjustment (Step S304). Source base station 10A modifies, for example transmission power in accordance with the notified radio parameter information (Step S305).

Here, when no cell pair is detected in the process at Step S302, network management device 30 determines that there isn't any cell pair whose radio quality has sharply degraded, and skips Steps S303 and S304. In this case, in source base station 10A the process at Step S305 is omitted.

According to the third exemplary embodiment, cell pairs whose radio quality has sharply deteriorated are detected based on the statistical information of the radio quality reported from individual mobile stations 20, and the radio parameter of the detected cell pair is adjusted, whereby it is possible to reduce the difference in radio quality between the source cell and the target cell. Accordingly, it is possible to reduce the probability of RLF taking place at mobile stations 20 and hence reduce the average handover failure ratio of the cell pair. Thus, it is possible to reduce temporary disruption time of communication accompanying handover.

Here, the process shown in the above third exemplary embodiment may be used together with the processes of the first and second exemplary embodiments. For example, when, after the first exemplary embodiment or the second exemplary embodiment is effected, the required handover failure ratio cannot be achieved, it is possible to further reduce temporary disruption time of communication accompanying handover if the process of the third exemplary embodiment is effected.

Although the third exemplary embodiment was described by giving a configurational example in which each base station 10 includes a measurement report setter, a communication quality storage, a handover processor and a radio parameter controller while network management device 30 includes a quality statistic storage, a cell pair detector and a radio parameter adjustor, the object of the present invention (contribution to reduction of temporary disruption time of communication accompanying handover) can be achieved if each base station 10 includes a measurement report setter and a communication quality storage while network management device 30 includes a cell pair detector. After all, as long as each base station 10 includes a measurement report setter and a communication quality storage while network management device 30 includes a cell pair detector, the operation and effect can be achieved to solve the problem of the invention.

The Fourth Exemplary Embodiment

The above third exemplary embodiment was described by giving examples of detecting a cell pair whose sharp degradation of radio quality is occurring by use of the probability of measurement reports based on two types of reporting conditions. In the fourth exemplary embodiment, one type of reporting condition is defined, and the probability that RSRQ included in the measurement report becomes lower than a predetermined value is used to detect cell pairs whose radio quality has degraded sharply. Since the configuration of the radio communication system is the same as that of the third embodiment, description is omitted herein.

Figure 13:
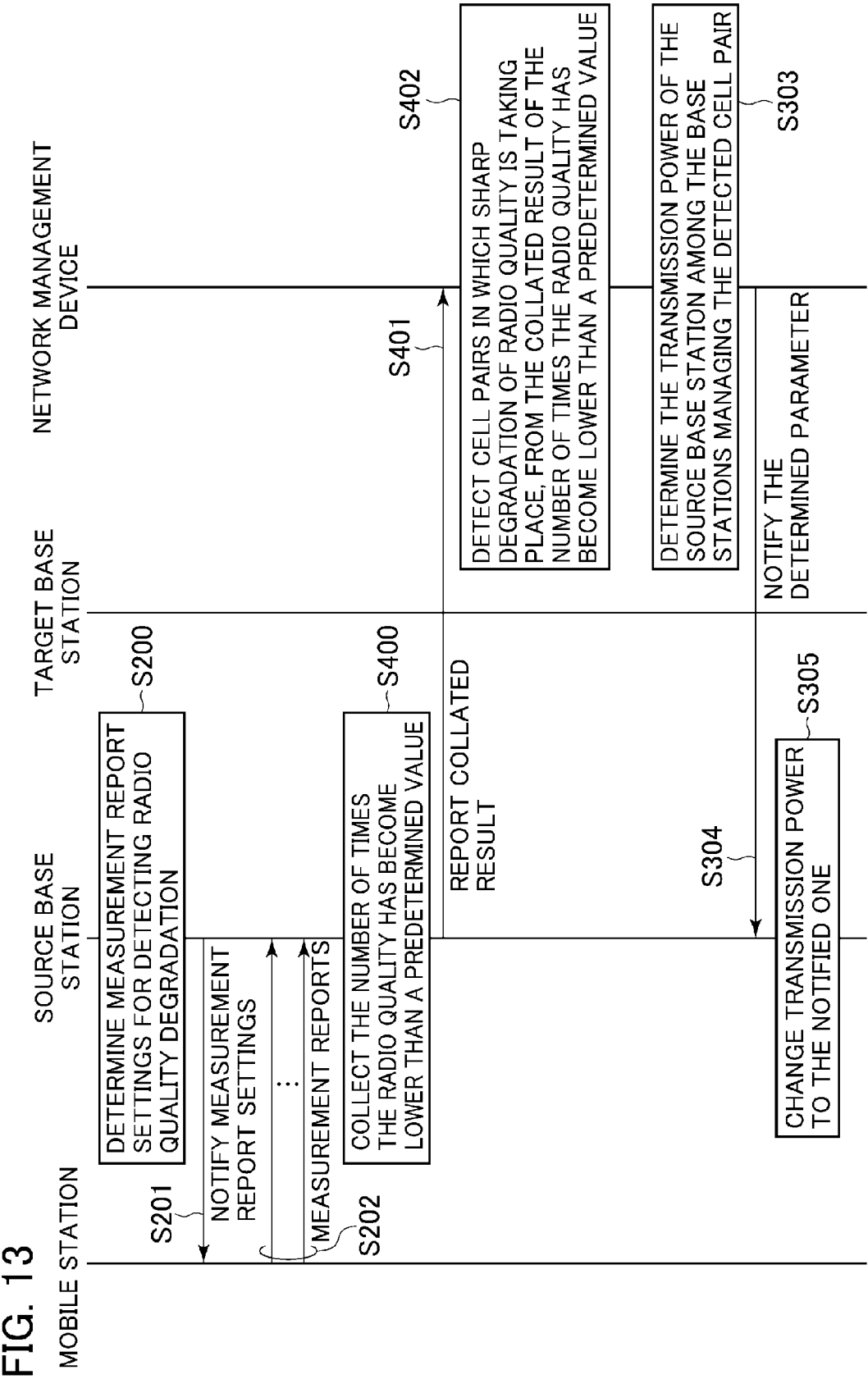
FIG. 13 is a sequence diagram showing one operation example of a radio communication system of the fourth exemplary embodiment.

FIG. 13 is a sequence diagram showing one operation example of the radio communication system of the fourth exemplary embodiment.

As shown in FIG. 13, source base station 10A first determines the reporting condition to be set for all the mobile stations 20 in the source cell (Step S200). Herein, similar to the second exemplary embodiment, in order to make mobile station 20 send a measurement report before the radio quality sharply degrades, offset parameters Off and TTT are set at smaller values than the ordinary values shown above for the first reporting condition.

Next, source base station 10A notifies the reporting condition determined at Step S200 to all the mobile stations 20 managed thereby (Step S201). When the reporting condition notified from source base station 10A is satisfied, mobile station 20 transmits a measurement report to source base station 10A (Step S202).

Source base station 10A, upon receiving the measurement reports from multiple mobile stations 20, collects those to generate statistical information on radio quality (Step S400). The statistical information on radio quality contains the number of measurement reports, the number of times the reported RSRQ became lower than the necessary quality (RLF judgment threshold). In this process, similar to the second exemplary embodiment, source base station 10A may change the reporting condition set at mobile station 20 into the periodic reporting condition when an event report is given.

Next, source base station 10A notifies the statistical information on radio quality generated at Step S400 to network management device 30 (Step S401). At this time, source base station 10A notifies the statistical information to network management device 30 at a predetermined cycle.

Network management device 30, based on the statistical information notified from source base station 10A, detects cell pairs in which radio quality has been sharply degraded (Step S402).

Whether or not a cell pair in which radio quality has been sharply degraded is detected by determining whether or not the following Ex. (6) is satisfied.

$$Q_{m,n} > Q_{th} \quad (6)$$

Herein, $Q_{m,n}$ is the probability that the RSRQ in the cell pair of cells #m and #n becomes lower than a predetermined quality while $Q_{th}$ is the detection threshold. That is, when the probability that the RSRQ becomes lower than the predetermined quality is greater than detection threshold $Q_{th}$, it is determined that the radio quality has been sharply degraded.

FIG. 14 is a graph showing one example of statistical information stored in the network management device of the fourth exemplary embodiment.

As shown in FIG. 14, the statistical information of this exemplary embodiment contains the number of measurement reports of each cell pair and the number of times the reported RSRQ became lower than the necessary quality (RLF judgment threshold).

In this case, when detection threshold $Q_{th}$ is assumed to be 30%, the probability that the RSRQ of the cell pair of cell #0 (source cell) and cell #1 becomes lower than the necessary quality is 40/100×100=40% in the example shown in FIG. 14, which satisfies the condition given by the above Ex. (6). Accordingly, network management device 30 detects the cell pair of cell #0 and cell #1 as a cell pair whose radio quality has been sharply degraded.

Thereafter, similarly to the third exemplary embodiment, network management device 30 determines the transmission power after adjustment for source base station 10A managing the source cell of the detected cell pair (Step S303), and notifies source base station 10A of the radio parameter information containing the radio parameter value after adjustment (Step S304). Source base station 10A modifies transmission power in accordance with the notified radio parameter information (Step S305).

According to the fourth exemplary embodiment, since just one type of reporting condition is used to set up mobile station 20, it is possible to reduce the amount of signaling required for the reporting condition to be notified from source base station 10A to mobile stations 20, compared to that in the third exemplary embodiment.

Here, the process shown in the above fourth exemplary embodiment may be used together with the processes of the first and second exemplary embodiments. For example, when, after the first exemplary embodiment or the second exemplary embodiment is effected, the necessary handover failure ratio cannot be achieved, it is possible to further reduce temporary disruption time of communication accompanying handover, by performing the process of the fourth exemplary embodiment.

Though the fourth exemplary embodiment was described giving a configurational example in which each base station 10 includes a measurement report setter, a communication quality storage, a handover processor and a radio parameter controller while network management device 30 includes a quality statistic storage, a cell pair detector and a radio parameter adjustor, similarly to the third exemplary embodiment the object of the present invention (helping to reduce temporary disruption time of communication accompanying handover) can be achieved if each base station 10 includes a measurement report setter and a communication quality storage while network management device 30 includes a cell pair detector. After all, as long as each base station 10 includes a measurement report setter and a communication quality storage while network management device 30 includes a cell pair detector, the operation and effect can be achieved to solve the problem of the invention.

The Fifth Exemplary Embodiment

The above third and fourth exemplary embodiments demonstrated methods for reducing temporary disruption time of communication by modifying the radio parameters at the source base station that manages the source cell of a cell pair whose radio quality has sharply degraded to thereby reduce handover failures. In the fifth exemplary embodiment, another method capable of reducing temporary disruption time of communication accompanying handover will be described.

In the wireless cellular system, when a handover failure due to Too Late Handover has taken place, there is a possibility that mobile station information on the mobile station that is to be handed off has not yet been transferred to the target base station. In this case, the mobile station needs to retry connection to the target base station by effecting an RRC connection setup (rrcConnectionSetup) process from RRC Idle state. Resultantly, the mobile station takes a long time to connect to the target base station after handover failure. To deal with this, in the fifth exemplary embodiment, mobile station information on the mobile station has been previously transferred from the source station to which the mobile station has been connected, to the target base station. Under this arrangement, when mobile station 20 retries connection to the target base station after handover failure, the mobile station can re-establish (rrcConnectionReestablishment) RRC-connection to the target base station from the continued state of RRC Connected. Accordingly, the time taken to connect to the target base station after handover failure can be shortened, thus making it possible to reduce temporary disruption time of communication accompanying handover. Since the configuration of the radio communication system is the same as that of the third exemplary embodiment, description is omitted herein.

Figure 15:
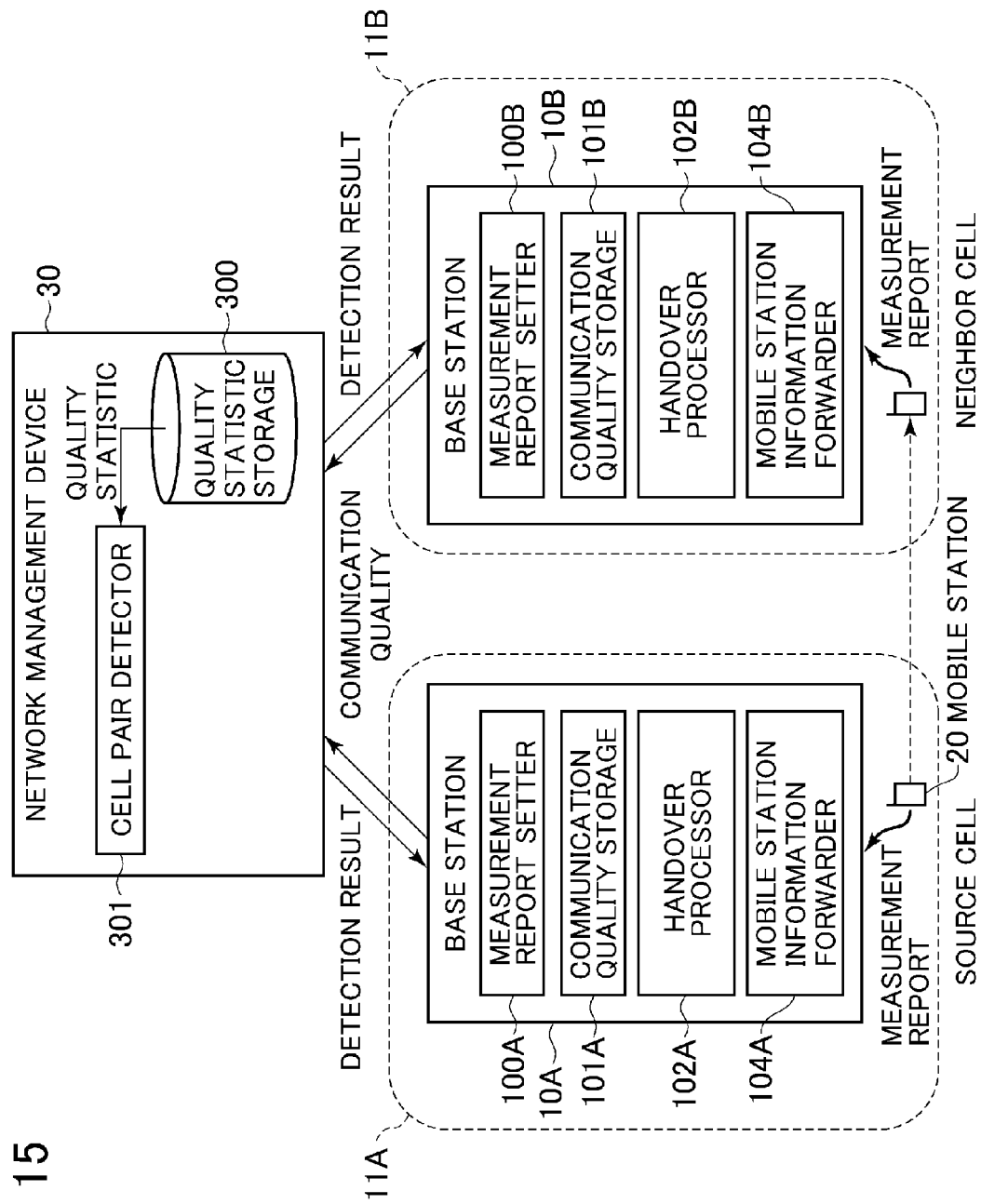
FIG. 15 is a block diagram showing one configurational example of base stations and a network management device of the fifth exemplary embodiment.

FIG. 15 is a block diagram showing one configurational example of base stations and a network management device of the fifth exemplary embodiment.

As shown in FIG. 15, network management device 30 of the fifth exemplary embodiment includes quality statistic storage 300 and cell pair detector 301. Base station 10A includes measurement report setter 100A, communication quality storage 101A, handover processor 102A and mobile station information forwarder 104A. Base station 10B includes measurement report setter 100B, communication quality storage 101B, handover processor 102B and mobile station information forwarder 104A.

Mobile station information forwarder 104A, upon receiving information on a cell pair in which radio quality has sharply degraded, from cell pair detector 301 of network management device 30, transfers the mobile station information to mobile station information forwarder 104B of base station 10B that manages target cell 11B of the cell pair.

The configurations of measurement reporting setter 100A, communication quality storage 101A, handover processor 102A provided for base station 10A as well as those of measurement reporting setter 100B, communication quality storage 101B, handover processor 102B provided for base station 10B, are the same as in the third exemplary embodiment, so description is omitted herein.

Further, the configurations of quality statistic storage 300 and cell pair detector 301 provided for network management device 30 are also the same as in the third exemplary embodiment, so description is omitted herein.

Measurement reporting setter 100A, communication quality storage 101A, handover processor 102A and mobile station information forwarder 104A, provided for base station 10A shown in FIG. 15, can be realized by means of an information processing device (computer) including, for example memories, various logic circuits and a CPU or the like that executes predetermined procedures in accordance with control programs. The CPU executes the procedures in accordance with the control programs to thereby realize the functions of measurement reporting setter 100A, communication quality storage 101A and mobile station information forwarder 104A. Measurement reporting setter 100B, communication quality storage 101B, handover processor 102B and mobile station information forwarder 104B, provided for base station 10B shown in FIG. 15 can also be operated in the same manner.

Further, cell pair detector 301 and radio parameter adjuster 302, provided for network management device 30 shown in FIG. 15 can also be realized by means of an information processing device (computer) including, for example memories, various logic circuits and a CPU or the like that executes predetermined procedures in accordance with control programs.

FIG. 16 is a sequence diagram showing one operation example of the radio communication system of the fifth exemplary embodiment. Here, mobile station A shown in FIG. 16 is a mobile station 20 that is connected to the source cell while mobile station B is a mobile station that begins connecting to the source cell.

The procedures Step S100 to S102 shown in FIG. 16 are the same as those of Steps 100 to S102 in the first exemplary embodiment shown in FIG. 5, so description is omitted herein. However, since the measurement report is statistically processed in the fifth exemplary embodiment, source base station 10A needs to receive measurement reports from multiple mobile stations 20 at Step S102.

In the radio communication system of the fifth exemplary embodiment, similar to the first exemplary embodiment, two types of reporting conditions are set up to send a measurement report to each mobile station 2.

Source base station 10A, upon receiving measurement reports from multiple base stations 20, generates statistical information on ratio quality by collating the reports (Step S300). The statistical information on ratio quality contains the numbers of measurement reports transmitted when the first reporting condition (Config1) and the second reporting condition (Config2) is satisfied, within a predetermined period.

Next, source base station 10A notifies the statistical information on radio quality generated at Step S300 to network management device 30 (Step S301). At this time, source base station 10A notifies the statistical information to network management device 30 at a predetermined cycle.

Network management device 30, based on the statistical information notified from source base station 10A, detects cell pairs in which radio quality has sharply degraded (Step S302).

Here, the procedures at Steps S101 to S102 and S301 to S302 shown FIG. 16 may be replaced by the procedures at Steps S201 to S201 and S401 to S402 shown in the fourth exemplary embodiment.

Next, network management device 30 notifies information on a cell pair detected at Step S302 to source base station 10A (Step S500). The information on a cell pair notified to source base station 10A is a PCI (Physical Cell ID) of the target cell to be paired with the source cell.

Source base station 10A having notified the PCI of the target cell, transfers the mobile station information of mobile station A to target base station 10B managing the target cell (Step S501). When there are mobile stations (not shown) that are connected to the source cell other than mobile station A, the information on those mobile stations is also transferred to target base station 10B. Mobile stations 20 whose mobile station information are transferred may be limited. For example, based on measurement reporting, only the mobile station information on mobile stations 20 whose radio quality has degraded lower than a predetermined value may be transferred to target base station 10B.

Next description will be made on a process when the radio quality (RSRQ) of mobile station A has sharply degraded and RLF is detected at mobile station A before transmission of a measurement report to source base station 10A.

Mobile station A, when detecting RLF due to sharp degradation of the radio quality (RSRQ) of the source cell (Step S502) to undergo handover failure (Too Late Handover), tries to connect to the cell that has the best radio quality. In this case, since Too Late Handover takes place and not the source cell, but the target cell has the best radio quality, mobile station A transmits a re-establishment request for RRC connection (rrcConnectionReestablishmentRequest) to target base station 10B (Step S503).

Since target base station 10B has received transfer of the mobile station information on mobile station A from source base station 10A at Step S501, the target base station can re-establish RRC connection with mobile station A. Accordingly, target base station 10B transmits a re-establishment notice (rrcConnectionReestablishment) to mobile station A (Step S504). Mobile station A, upon completing re-establishment of RRC connection with target base station 10B, transmits a re-establishment complete notice (rrcConnectionReestablishmentComplete) to the target base station 10B (Step S505).

Next, description will be given on the process when mobile station B starts connecting to the source cell after Step S505, and then detects RLF before transmitting a measurement report to source base station 10A due sharp degradation of RSRQ.

When mobile station B transmits an RRC connection setup request (rrcConnectionSetupRequest) to source base station 10A in order to start new communication (Step S506), source base station 10A returns an RRC connection setup notice (rrcConnectionSetup) to mobile station B (Step S507). Thereafter, mobile station B transmits an RRC connection setup complete notice (rrcConnectionSetupComplete) to source base station 10A to start communication with the source base station 10A (Step S508). Source base station 10A, upon having mobile station B connected to it, transfers the mobile station information on the mobile station B to paired target base station 10B of the cell pair that has been reported at Step S500 (Step S509).

Mobile station B, when detecting RLF due to sharp degradation of the radio quality (RSRQ) (Step S510) to undergo handover failure (Too Late Handover), tries to connect to the cell that has the best radio quality. In this case, since Too Late Handover takes place and not the source cell, but the target cell has the best radio quality, mobile station B transmits a re-establishment request for RRC connection (rrcConnectionReestablishmentRequest) to target base station 10B managing the target cell (Step S511).

Since target base station 10B has already received transfer of the mobile station information on mobile station B from source base station 10A at Step S509, the target base station can re-establish RRC connection with mobile station B. Accordingly, target base station 10B transmits a re-establishment notice (rrcConnectionReestablishment) to mobile station B (Step S514). Mobile station B, upon completing re-establishment of RRC connection with target base station 10B, transmits a re-establishment complete notice (rrcConnectionReestablishmentComplete) to the target base station 10B (Step S513).

According to the fifth exemplary embodiment, since the mobile station information required for a handover has been previously transferred from the source base station to the target base station, it is not necessary for mobile station 20 to perform an RRC connection setup (rrcConnectionSetup) process from RRC Idle state to connect to the target base station when handover failure (Too Late Handover) takes place. Mobile station 20, when connecting to the target base station after handover failure, can re-establish RRC connection to the target base station from the continued state of RRC Connected. As a result, the time required for re-connection after handover failure can be shortened, hence it is possible to reduce temporary disruption time of communication accompanying handover.

Here, the process shown in the above fifth exemplary embodiment may also be used together with the processes of the first and second exemplary embodiments. Alternatively, the process shown in the above fifth exemplary embodiment may also be used together with the process of the third or fourth exemplary embodiment. For example, when, after the first exemplary embodiment or the second exemplary embodiment is effected, the required handover failure ratio cannot be achieved, it is possible to further reduce temporary disruption time of communication accompanying handover, by performing the process of the fifth exemplary embodiment.

The processes shown in the first to fifth exemplary embodiments described above may also be used together with the background technique of dynamically adjusting handover parameters. For example, when the necessary handover failure ratio cannot be achieved by adjustment of CIO as a handover parameter shown in the background art, the methods shown in the first to fifth exemplary embodiments are available.

The methods shown in the first to fifth exemplary embodiments described above can be expected to be more effective when used in a communication environment containing outdoor cells and indoor cells together because such an environment often undergoes sharp change of radio quality.

The effect of the present embodiment can also be expected in a communication environment in which cells of different cell sizes (macro cells, femtocells, etc.) coexist. This is because it is common that in most cases macro cells having large size are deployed outdoors while femtocells having small size are installed indoors.

Further, though the above first to fifth exemplary embodiments were described by giving examples of handovers between cells using the same frequency band in the same radio access technology (RAT: Radio Access Technology), the present invention, not limited to this, but can be applied to handovers between different radio access technologies or handovers between different frequency bands.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

This application claims priority based on Japanese Patent Application 2013-244001 filed on Nov. 26, 2013, and should incorporate all the disclosure thereof herein.

What is claimed is:

1. A radio communication system comprising a plurality of base stations, each performing radio communication with mobile stations via a cell managed thereby, wherein the base station comprises:
a measurement report setter that notifies each mobile station that is connected thereto of reporting conditions for causing the mobile station to transmit a measurement report containing measurement results of the radio quality of the cell thereof and of each of neighboring cells adjacent to the subject cell; and,
a handover processor that, based on the measurement reports transmitted from the mobile stations, detects a mobile station whose radio quality becomes lower than a predetermined value within a predetermined period and performs a handover process of the mobile station,
wherein the measurement report setter notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and
wherein the handover processor detects a mobile station that has transmitted a measurement report as a result of satisfaction of the second reporting condition as a mobile station that requires the handover.

2. A base station that is provided for a radio communication system to perform radio communication with mobile stations via a cell managed thereby, comprising:
a measurement report setter that notifies each mobile station that is connected thereto of reporting conditions for causing the mobile station to transmit a measurement report containing measurement results of the radio quality of the cell thereof and of each of neighboring cells adjacent to the subject cell; and
a handover processor that, based on the measurement reports transmitted from the mobile stations, detects a mobile station whose radio quality becomes lower than a predetermined value within a predetermined period and that performs a handover process of the mobile station,
wherein the measurement report setter notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and
wherein the handover processor detects a mobile station that has transmitted a measurement report as a result of satisfaction of the second reporting condition as a mobile station that needs the handover.

3. A handover control method for use in a radio communication system comprising a plurality of base stations, each performing radio communication with mobile stations via a cell managed thereby, wherein
the base station
notifies each mobile station that is connected thereto of reporting conditions for causing the mobile station to transmit a measurement report containing measurement results of the radio quality of the cell thereof and of each of neighboring cells adjacent to the subject cell, the reporting conditions including a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and
detects, based on the measurement report transmitted from the mobile station, the mobile station that has transmitted a measurement report by satisfaction of the second reporting condition, as a mobile station that requires handover and whose radio quality becomes lower than a predetermined value within a predetermined period.

4. A non-transitory computer-readable recording medium recording a program that makes a computer function as a base station provided for a radio communication system to perform radio communication with mobile stations via a cell managed thereby,
causes the computer to function as
a measurement report setter that notifies each mobile station that is connected thereto of reporting conditions for causing the mobile station to transmit a measurement report containing measurement results of the radio quality of the cell thereof and of each of neighboring cells adjacent to the subject cell, and
a handover processor that, based on the measurement reports transmitted from the mobile stations, detects a mobile station whose radio quality becomes lower than a predetermined value within a predetermined period and performs a handover process of the mobile station,
wherein the computer is made to function as the measurement report setter which notifies the mobile stations of a first reporting condition and a second reporting condition in which the offset value added to the measurement result of the radio quality is greater than that of the first reporting condition and in which a guard time, that is a time from when the reporting condition is satisfied until the measurement report is transmitted, is shorter than that of the first reporting condition, and
wherein the computer is made to function as the handover process which detects a mobile station that transmitted a measurement report as a result of satisfying the second reporting condition and that needs to undergo handover.

* * * * *